United States Patent
Ishii et al.

(10) Patent No.: US 7,302,934 B2
(45) Date of Patent: Dec. 4, 2007

(54) SADDLE-STRADDLING TYPE MOTOR VEHICLE

(75) Inventors: Wataru Ishii, Shizuoka (JP); Hiroyuki Tsuzuku, Shizuoka (JP); Toshiharu Hanajima, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 10/598,685

(22) PCT Filed: Mar. 24, 2005

(86) PCT No.: PCT/JP2005/005405

§ 371 (c)(1),
(2), (4) Date: Sep. 8, 2006

(87) PCT Pub. No.: WO2005/098231

PCT Pub. Date: Oct. 20, 2005

(65) Prior Publication Data

US 2007/0175688 A1    Aug. 2, 2007

(30) Foreign Application Priority Data

Mar. 30, 2004 (JP) ............................. 2004-101190

(51) Int. Cl.
*B62K 111/00* (2006.01)
*F02M 51/00* (2006.01)

(52) U.S. Cl. .................. 123/445; 123/472; 123/188.14; 180/219

(58) Field of Classification Search ................ 123/445, 123/472, 585, 188.4; 180/219, 229, 68.1, 180/68.4

See application file for complete search history.

(56) References Cited

U.S. PATENT DOCUMENTS 4,517,941 A    5/1985    Nakagawa
5,309,886 A    5/1994    Hitomi et al.

(Continued)

FOREIGN PATENT DOCUMENTS

EP           1 553 288           7/2005

(Continued)

OTHER PUBLICATIONS

International Search Report issued in the corresponding International Application No. PCT/JP2005/005405, mailed on Jul. 12, 2005.

*Primary Examiner*—Hieu T. Vo
(74) *Attorney, Agent, or Firm*—Keating & Bennett, LLP

(57) ABSTRACT

An air-cooled engine is hung and fixed under a rear part of a backbone of a body frame. The engine is disposed so that the center axis of a cylinder in its cylinder block extends approximately horizontally and so that its cylinder head is directed toward the front. A fuel injection device is located between an intake valve and an intake port in the cylinder head. An injection nozzle of the fuel injection device and an intake valve opening are placed at a short distance. While the vehicle is idling or running at low speed, the vicinity of the tip of an injector of the fuel injection device is cooled by assist air supplied from a throttle body through a secondary passage, and when the vehicle runs normally or at high speed, the fuel injection device is cooled by the wind that hits the cylinder head.

18 Claims, 13 Drawing Sheets

U.S. PATENT DOCUMENTS

| | | | |
|---|---|---|---|
| 5,509,397 A | | 4/1996 | Hoshi |
| 5,794,856 A | * | 8/1998 | Nally .................. 239/585.4 |
| 5,819,706 A | | 10/1998 | Tsuchida et al. |
| 5,894,831 A | * | 4/1999 | Takahashi et al. .......... 123/470 |
| 6,453,888 B1 | | 9/2002 | Ueda et al. |
| 6,918,372 B2 | * | 7/2005 | Nishii et al. ................ 123/306 |
| 7,213,542 B2 | * | 5/2007 | Oshima et al. ............. 180/219 |

FOREIGN PATENT DOCUMENTS

| | | |
|---|---|---|
| EP | 1 555 431 | 7/2005 |
| EP | 1 559 909 | 8/2005 |
| GB | 2 296 292 | 6/1996 |
| JP | 59-96363 | 6/1984 |
| JP | 61-112773 | 5/1986 |
| JP | 2-141678 | 11/1990 |
| JP | 03-237263 | 10/1991 |
| JP | 4-107483 | 9/1992 |
| JP | 05-033744 | 2/1993 |
| JP | 07-077137 | 3/1995 |
| JP | 07-022391 | 5/1995 |
| JP | 07-247941 | 9/1995 |
| JP | 08-021341 | 1/1996 |
| JP | 08-177687 | 7/1996 |
| JP | 09-014102 | 1/1997 |
| JP | 09-096269 | 4/1997 |
| JP | 09-291868 | 11/1997 |
| JP | 11-280620 | 10/1999 |
| JP | 3071260 | 5/2000 |
| JP | 2000-185683 | 7/2000 |
| JP | 2000-249028 | 9/2000 |
| JP | 2001-132589 | 5/2001 |
| JP | 2002-037165 | 2/2002 |
| JP | 2002-327665 | 11/2002 |
| JP | 2003-013826 | 1/2003 |
| JP | 2003-278627 | 10/2003 |
| JP | 2004-099040 | 4/2004 |
| WO | 2004/038213 | 5/2004 |
| WO | 2004/038214 | 5/2004 |
| WO | 2004/040130 | 5/2004 |

* cited by examiner

SADDLE-STRADDLING TYPE MOTOR VEHICLE

TECHNICAL FIELD

The present invention relates to a saddle-straddling type motor vehicle, such as a two-wheeled or three-wheeled motorcycle, equipped with an engine having a fuel injection device.

BACKGROUND ART

Some conventionally known motor vehicles designed to be straddled by riders, such as under-bone type two-wheeled and three-wheeled motorcycles, have electronically-controlled fuel injection devices in place of carburetors in the intake systems of engines. For example, the under-bone type motorcycles described in Patent Documents 1 and 2 have engines attached under the backbones. In the motorcycles, a fuel injection device is positioned downstream of a throttle valve, in an intake passage that communicates to an intake valve opening of the engine.

FIG. 14 is apartial side view showing an example of a conventional under-bone type motorcycle equipped with an engine having a fuel injection device (see Patent Document 1). FIG. 14 shows the intake system partially in cross-section.

The under-bone type motorcycle 1 shown in FIG. 14 has a backbone 3 that extends rearward and obliquely downward from a head pipe 2. The head pipe 2 turnably supports a steering shaft, with handles attached on top of the steering shaft.

An engine 4 is positioned under the rear part of the backbone 3. An air cleaner 5 is positioned under the front part of the backbone 3. The air cleaner 5 is connected to an intake port 4a of the engine 4 through an intake pipe 6. A throttle body 7 is interposed in the intake pipe 6.

The part of the intake pipe 6 that is connected to the intake port 4a is bent, and a fuel injection device 8 is attached to the bent part in such a direction that the fuel injection device 8 injects fuel toward an intake valve opening 4b.

In order to prevent thermal damage from the engine 4, the fuel injection device 8 is positioned in the rear part of the intake pipe 6 above the engine 4 as distant as possible from the intake valve (the intake valve opening 4b) of the cylinder of the engine 4.

This is for the reason below. If the fuel injection device 8 is placed proximate to the cylinder head 4c of the engine 4, the temperature raised by the engine 4 heats the fuel injection device 8. This causes vapor in the fuel injected by the fuel injection device 8, causing troubles like vapor lock or breathing. The fuel injection device 8 is therefore separated as distant as possible from the cylinder head 4c of the engine 4. For example, the fuel injection device 8 is positioned at a distance of 90 mm or more from the cylinder head 4c of the engine 4.

However, placing the fuel injection device 8 apart from the engine 4 lengthens the distance of fuel transport from the fuel injection device to the combustion chamber. This deteriorates the response of the engine 4 to variation of the fuel injection by the fuel injection device 8. Furthermore, fuel injected by the fuel injection device 8 will adhere to the wall surface of the intake pipe 6 and the intake port 4a before reaching the intake valve opening 4b. The fuel adhering on the wall surface may then enter the cylinder regardless of control of the fuel injection device 8, deteriorating exhaust gas condition.

Also, with a conventional under-bone type motorcycle whose intake passage is positioned in a front part of the body, the fuel injection device is usually positioned in the rear of the intake system including the intake pipe. The fuel injection device is then not cooled by the wind that hits the motorcycle in running. The fuel injection device is least likely to be cooled especially when the motorcycle is idling or running at low speed, because the motorcycle faces a lower wind.

Therefore, a water-cooled engine is used as described in Patent Document 2. However, it is still difficult to sufficiently cool the fuel injection device.

Patent Document 3 discloses a V-type water-cooled engine equipped with an assist air control device. An assist air passage branches off from a point upstream of a throttle valve and extends to the fuel injection device, with a solenoid valve provided in the course of the assist air passage to control the amount of assist air supply. A water-temperature sensor detects the temperature of engine cooling water and the amount of assist air supply is increased when the temperature is increased.

[Patent Document 1] Japanese Patent Application Laid-Open No. 2000-249028

[Patent Document 2] Japanese Patent Application Laid-Open No. 2002-37165

[Patent Document 3] Japanese Patent Application Laid-Open No. 5-33744

DISCLOSURE OF THE INVENTION

Problems to be Solved by the Invention

However, as mentioned above, the structures described in Patent Documents 1 and 2 require the use of a water-cooled engine to cool the fuel injection device while the motorcycle is idling or running. Furthermore, because cooling the engine with water is not enough to sufficiently cool the fuel injection device, there is a need to use a cooling device for positively water-cooling the fuel injection device and its vicinity, which complicates the structure and increases costs.

Also, the V-typewater-cooled engine having an assist air control device described in Patent Document 3 is complicated in structure and involves complicated control to regulate the amount of assist air supply on the basis of engine temperature. Therefore, applying the water-cooled engine with an assist air control device to a motorcycle, too, requires increased costs.

Means for Solving the Problems

An object of the present invention is to provide a saddle-straddling type motor vehicle which has a fuel injection device cooled with a simple structure and at low cost to prevent formation of vapor in fuel, and which is capable of precisely controlling fuel injection.

(1)

According to the present invention, a saddle-straddling type motor vehicle comprises a body frame situated from a front part to a rear part of the motor vehicle and an air-cooled engine attached to the body frame, wherein the body frame includes a head pipe disposed approximately uprightly in the front part of the motor vehicle and a main frame extending rearward and obliquely downward from the head pipe, and wherein the air-cooled engine includes a cylinder block forming a cylinder that reciprocatably accommodates a piston, a cylinder head forming a combustion chamber together with the cylinder block and having a primary passage communicating with the combustion chamber through an intake valve opening, an intake valve provided to open and close the intake valve opening, a fuel injection device having an injection nozzle that injects fuel, and a secondary passage that branches off from upstream of the primary passage and that guides air to the vicinity of the injection nozzle of the fuel injection device at least when the air-cooled engine is idling, and wherein, under the main frame, the cylinder head is located in a front part and the cylinder block is located in a rear part such that a center axis of the cylinder extends approximately horizontally in the front-to-rear direction of the motor vehicle and so that the cylinder head is hit by the wind when the motor vehicle runs, and wherein the fuel injection device is provided in the cylinder head so that the fuel injection device injects the fuel toward the intake valve opening from an injection passage in a side wall of the primary passage.

In the saddle-straddling type motor vehicle, an air-cooled engine is attached to the body frame. The head pipe of the body frame is disposed approximately uprightly in the front part of the motor vehicle and the main frame extends rearward and obliquely downward from the head pipe.

The cylinder block of the air-cooled engine forms a cylinder that reciprocatably accommodates a piston. The cylinder head forms a combustion chamber together with the cylinder block and has a primary passage that communicates with the combustion chamber through the intake valve opening. The intake valve is provided to open and close the intake valve opening. A secondary passage branches off from upstream of the primary passage and guides air to the injecting port of the fuel injection device at least when the air-cooled engine is idling.

Under the main frame, the cylinder head is located in the front and the cylinder block is located in the rear such that the center axis of the cylinder extends approximately horizontally in the front-to-rear direction and so that the cylinder head is hit by the wind while the motor vehicle is running. The fuel injection device is provided in the cylinder head so that the fuel injection device injects fuel toward the intake valve opening from an injection passage in the side wall of the primary passage.

Thus, air is guided to the vicinity of the injection nozzle of the fuel injection device through the secondary passage at least when the air-cooled engine is idling. This atomizes the fuel injected from the fuel injection device and cools the vicinity of the injection nozzle of the fuel injection device at least when the engine is idling. The cylinder head is located in the front under the main frame. The cylinder head is therefore hit by the wind when the motor vehicle runs. Then, the fuel injection device, provided in the cylinder head, is cooled by the wind that hits the cylinder head. The cooling effect by the wind is especially noticeable when the motor vehicle runs at high speed.

Thus, the fuel injection device is prevented from being heated up by heat from the engine while the motor vehicle is stopped and when the motor vehicle is running. This prevents formation of vapor in the fuel injected by the fuel injection device and hence prevents troubles due to vapor, such as vapor lock or breathing.

Thus, the vicinity of the injection nozzle of the fuel injection device is cooled by fuel atomizing air at least when the vehicle is idling, and the fuel injection device is naturally cooled by the wind that hits the cylinder head when the vehicle runs, so that there is no need to use a special cooling device and special control, and the air through the secondary passage can be controlled simply. The fuel injection device can thus be cooled with a simplified structure at reduced cost.

Also, because the fuel injection device injects fuel toward the intake valve opening from the injection passage in the side wall of the primary passage in the cylinder head, the distance between the injection nozzle of the fuel injection device and the intake valve opening is short, and hence the fuel transport distance is short. Therefore, the fuel injected by the fuel injection device is less likely to adhere to the wall surface, and the fuel is guided into the combustion chamber through the intake valve opening. This prevents the problem that fuel adhering on the wall surface enters the cylinder regardless of control of the fuel injection device. As a result, precise fuel injection control is possible and fuel consumption is improved. This also alleviates deterioration of exhaust gas condition which is caused by exhaust of unburned fuel when fuel supply is stopped or when idling is stopped.

Also, shortening the fuel transport distance enhances the response of rotating speed of the engine to throttle operation. Therefore, the rotating speed of the engine can be increased and decreased without delay even when the throttle is operated quickly.

(2)

The primary passage may extend approximately uprightly from the intake valve opening, with the intake valve located so that its axis extends approximately in the front-to-rear direction, and the fuel injection device maybe located at an incline between the primary passage and the intake valve.

In this case, a space for the fuel injection device is ensured between the primary passage and the intake valve in the cylinder head without a need to enlarge the cylinder head.

(3)

The primary passage may extend approximately uprightly from the intake valve opening, with the intake valve located so that its axis extends approximately in the front-to-rear direction, and the fuel injection device may be located at an incline on a side of the primary passage.

In this case, a space for the fuel injection device is ensured on a side of the primary passage in the cylinder head without a need to enlarge the cylinder head.

(4)

The air-cooled engine may further include a throttle body extending upward from the primary passage and a first opening/closing mechanism capable of opening and closing in the throttle body, and the secondary passage may branch off from a part of the throttle body that is upstream of the first opening/closing mechanism.

In this case, by approximately fully closing the first opening/closing mechanism, a large amount of air can be supplied to the vicinity of the injection nozzle of the fuel injection device through the secondary passage. This effectively cools the vicinity of the injection nozzle of the fuel injection device and promotes atomization of fuel while the vehicle is stopped or is running at low speed. Also, the air flow rate through the primary passage can be easily controlled by controlling the open degree (openness) of the first opening/closing mechanism.

(5)

The engine may further include a second opening/closing mechanism capable of opening and closing and located, in the throttle body, upstream of the part from which the secondary passage branches off.

In this case, the air flow rate through the secondary passage can be easily controlled by controlling the open degree of the second opening/closing mechanism, with the first opening/closing mechanism being approximately full closed. This makes it possible to efficiently cool the vicinity of the injection nozzle of the fuel injection device.

Also, the air flow rate through the primary passage can be easily controlled according to the load placed on the engine by controlling the open degree of the second opening/closing mechanism in association with the first opening/closing mechanism.

(6)

When no load is placed on the engine and when a load equal to or smaller than a first value is placed on the engine, the first opening/closing mechanism may be approximately full closed and the open degree of the second opening/closing mechanism may be controlled by an operation by the rider.

In this case, the air flow rate through the secondary passage can be easily controlled by an operation by the rider when no load is placed on the engine and when a load equal to or smaller than a first value is placed on the engine. This makes it possible to efficiently cool the vicinity of the injection nozzle of the fuel injection device according to the load placed on the engine while the motor vehicle is running at low speed.

(7)

When a load larger than the first value is placed on the engine, the open degree of the first opening/closing mechanism may be controlled by an operation by the rider and the open degree of the second opening/closing mechanism may be controlled in association with the first opening/closing mechanism.

In this case, when a load larger than the first value is placed on the engine, the air flow rate through the secondary passage can be easily controlled by an operation by the rider and the air flow rate through the primary passage can be easily controlled according to the load placed on the engine. This makes it possible to efficiently cool the vicinity of the injection nozzle of the fuel injection device according to the load placed on the engine, and to properly control the air flow rate supplied to the combustion chamber from the intake valve opening through the primary passage, when the motor vehicle runs at low speed or high speed.

(8)

When the load placed on the engine is equal to or smaller than a second value that is larger than the first value, the air flow rate in the secondary passage may increase as the load placed on the engine increases, and when the load placed on the engine exceeds the second value, the air flow rate in the secondary passage may decrease.

In this case, it is possible to efficiently cool the vicinity of the injection nozzle of the fuel injection device according to the load placed on the engine when the load on the engine is equal to or smaller than the second value that is larger than the first value. Also, when the load on the engine exceeds the second value, the air flow rate supplied to the vicinity of the injection nozzle of the fuel injection device through the secondary passage decreases when the air flow rate supplied into the combustion chamber from the intake valve opening through the primary passage increases. In this case, the fuel injection device is cooled by the wind that hits the cylinder head.

(9)

The air flow rate in the secondary passage may remain approximately constant while the load placed on the engine is larger than the second value.

In this case, the fuel injection device is cooled more effectively by the wind that hits the cylinder head, and atomization of fuel is promoted by the air supplied to the vicinity of the injection nozzle of the fuel injection device through the secondary passage.

(10)

When the load placed on the engine is larger than the first value, the air flow rate in the primary passage may increase as the load placed on the engine increases.

In this case, when the load on the engine is larger than the first value, the air flow rate supplied into the combustion chamber from the intake valve opening through the primary passage increases as the load placed on the engine increases. Then, a proper amount of air is mixed with the fuel according to the load placed on the engine.

(11)

The distance from the tip of the injection nozzle of the fuel injection device to the intake valve opening may be 4 cm or less.

In this case, the fuel transport distance is so short that the fuel injected by the fuel injection device hardly adheres to the wall surface before guided into the combustion chamber through the intake valve opening. This certainly prevents the problem that the fuel adhering on the wall surface enters the cylinder regardless of control of the fuel injection device. This enables high-precision fuel injection control and considerably improves fuel consumption. This also satisfactorily alleviates deterioration of exhaust gas condition which is caused by exhaust of unburned fuel when fuel supply is stopped or when idling is stopped. This also further improves the response of rotating speed of the engine to the throttle operation.

(12)

The fuel injection device may be situated so that at least part of the fuel injection device is exposed outside from the cylinder head.

In this case, the fuel injection device is directly hit by the wind while the motor vehicle is running and is sufficiently cooled naturally. The cooling effect by the wind is considerably enhanced especially when the motor vehicle runs at high speed.

(13)

The fuel injection device may be situated to incline obliquely upward toward the front with respect to the horizontal direction.

In this case, the fuel injection device can be disposed in the cylinder head so that the injection nozzle of the fuel injection device is placed still closer to the intake valve opening and so that the end of the fuel injection device is hit by the wind.

(14)

The intake valve may be located so that its axis is inclined obliquely upward toward the front at an angle larger than 0 degree and smaller than 45 degrees with respect to the horizontal direction.

In this case, the fuel injection device can be disposed at an incline in the cylinder head in an area between the primary passage and the intake valve. This allows size reduction of the engine.

(15)

The cylinder head may have an exhaust passage that guides burned gas outside from the combustion chamber through an exhaust valve opening, and the engine may further include an exhaust valve provided to open and close the exhaust valve opening, and the exhaust valve may be situated so that its axis is inclined obliquely downward toward the front at an angle larger than 0 degree and smaller than 45 degrees with respect to the horizontal direction.

In this case, the intake valve and the exhaust valve can be arranged approximately symmetrically with respect to the horizontal axis. This allows size reduction of the cylinder head.

(16)

According to another aspect of the present invention, a saddle-straddling type motor vehicle comprises an air-cooled engine attached to a body frame and having a cylinder block provided on the rear side in the direction in which the motor vehicle runs and a cylinder head provided on the front side in the direction in which the motor vehicle runs, a primary passage that guides air into a combustion chamber of the air-cooled engine, a fuel injection device having an injection nozzle that injects fuel in the primary passage, and a secondary passage that branches off from upstream of the primary passage and that guides air to the vicinity of the injection nozzle of the fuel injection device at least when the air-cooled engine is idling, and the fuel injection device is located in a position further forward than the cylinder block in the direction in which the motor vehicle runs.

In the saddle-straddling type motor vehicle, the air-cooled engine is attached to the body frame. The engine is attached to the body frame with the cylinder block located in the rear in the running direction of the motor vehicle and the cylinder head located in the front in the running direction of the motor vehicle. The fuel injection device is located in a position further forward than the cylinder block in the running direction of the motor vehicle.

Air is guided to the vicinity of the injection nozzle of the fuel injection device through the secondary passage at least when the air-cooled engine is idling. This atomizes the fuel injected from the fuel injection device and cools the vicinity of the injection nozzle of the fuel injection device at least when the engine is idling. The cylinder head is located on the front side in the running direction of the motor vehicle. The cylinder head is therefore hit by the wind when the motor vehicle runs. Then, because the fuel injection device is located further forward than the cylinder block in the running direction of the motor vehicle, the fuel injection device is cooled by the wind that hits the cylinder head. The cooling effect by the wind is especially noticeable when the motor vehicle runs at high speed.

Thus, the fuel injection device is prevented from being heated to high temperature by heat from the engine while the motor vehicle is stopped and when the motor vehicle is running. This prevents formation of vapor in the fuel injected by the fuel injection device and hence prevents troubles due to vapor, such as vapor lock or breathing.

The vicinity of the injection nozzle of the fuel injection device is cooled by fuel atomizing air at least when the vehicle is idling, and the fuel injection device is naturally cooled by the wind that hits the cylinder head when the vehicle runs, so that there is no need to use a special cooling device and special control, and the air through the secondary passage can be controlled simply. The fuel injection device can thus be cooled with a simplified structure at reduced cost.

(17)

The air-cooled engine may further include an intake valve located at a border between the primary passage and the combustion chamber, and the fuel injection device may be located at an incline between the primary passage and the intake valve.

In this case, the distance between the injection nozzle of the fuel injection device and the intake valve is short, and hence the fuel transport distance is short. Therefore, the fuel injected by the fuel injection device is less likely to adhere to the wall surface, and the fuel is guided into the combustion chamber through an intake valve opening. This prevents the problem that fuel adhering on the wall surface enters the cylinder regardless of control of the fuel injection device. As a result, precise fuel injection control is possible and fuel consumption is improved. This also alleviates deterioration of exhaust gas condition which is caused by exhaust of unburned fuel when fuel supply is stopped or when idling is stopped.

Also, shortening the fuel transport distance enhances the response of rotating speed of the engine to the throttle operation. Therefore, the rotating speed of the engine can be increased and decreased without delay even when the throttle is operated quickly.

(18)

The body frame may include a head pipe disposed approximately uprightly in a front part of the motor vehicle, and a main frame extending rearward and obliquely downward from the head pipe. This allows the rider to easily straddle the saddle-straddling type motor vehicle.

(19)

The fuel injection device may further include a cylindrical member that forms an injecting port in front of the injection nozzle and the cylinder head may have a circular space that surrounds the cylindrical member, and the cylindrical member may have a passage or a plurality of passages that allow the injecting port and the circular space to communicate with each other, with an end of the secondary passage connected to the circular space.

In this case, air supplied from the secondary passage flows into the circular space and is guided into the injecting port through the passages of the cylindrical member. Then, the fuel injected from the injecting port of the fuel injection device is efficiently atomized, and the vicinity of the injecting port is cooled by the air flowing in the circular space.

(20)

The cylindrical member may have a plurality of passages that allow the injecting port and the circular space to communicate with each other, and one of the plurality of passages that is the closest to the end of the secondary passage may have a center axis that forms an angle not less than a predetermined value with the axis line of the end of the secondary passage.

In this case, the air supplied from the secondary passage does not directly pass through a particular single passage of the cylindrical member, but the air uniformly flows in the circular space and flows into the injecting port through the plurality of passages of the cylindrical member. Then, the fuel and air are uniformly mixed in the injecting port and the mixture gas is injected from the injecting port toward the intake valve opening without being distorted in a particular direction. This prevents the mixture gas injected from the injecting port from adhering to the wall surface.

(21)

The cylinder block may have a plurality of radiation fins that protrude outward from an outer periphery of the cylinder block. In this case, heat is effectively radiated from the outer periphery of the cylinder block.

EFFECTS OF THE INVENTION

According to the present invention, while the motor vehicle is stopped or running at low speed, the fuel injection device is cooled by air supplied to the fuel injection device from the secondary passage, and when the motor vehicle runs, the fuel injection device is cooled by the wind that hits the cylinder head. The fuel injection device is thus cooled with a simple structure and at low cost. It is thus possible to prevent formation of vapor in the fuel and to provide precise control of the fuel injection.

BRIEF DESCRIPTION OF THE DRAWINGS

FIG. 1 is a side view of a motorcycle according to a first embodiment of the present invention.

FIG. 2 is an enlarged partially cross-sectional view of the part X of the motorcycle of FIG. 1.

FIG. 3 is a cross-sectional view of the right side of the engine of the motorcycle of FIG.1.

FIG. 4 is an enlarged cross-sectional view of part of the engine of FIG. 3.

FIG. 5a is a diagram showing an injecting port of a holder of the embodiment.

FIG. 5b is a cross-sectional view of an injecting port of a holder, where the positioning of the communicating passages of the holder shown in FIG. 5a is changed.

FIG. 6 is a diagram showing a relation between load and throttle open degree.

FIG. 7 is a diagram showing a relation between load and air flow rates.

FIG. 8 is a diagram showing a relation between injector tip temperature and assist air flow rate.

FIG. 9 is a diagram showing a relation between the air flow rate in a secondary passage and engine strokes.

FIG. 10 is a diagram showing variations of injector tip temperature exhibited when an engine is stopped immediately after a motorcycle ran with a high load.

FIG. 11 is an enlarged partially cross-sectional view showing an engine and its vicinity of a motorcycle according to a second embodiment of the present invention.

FIG. 12 is a diagram showing the structure of a main part of the engine of FIG. 11, seen from the front.

FIG. 13 is a diagram showing examples of positioning of the fuel injection device.

FIG. 14 is a partial side view showing an example of a conventional under-bone type motorcycle equipped with an engine having a fuel injection device.

BEST MODE FOR CARRYING OUT THE INVENTION

Figure 1:
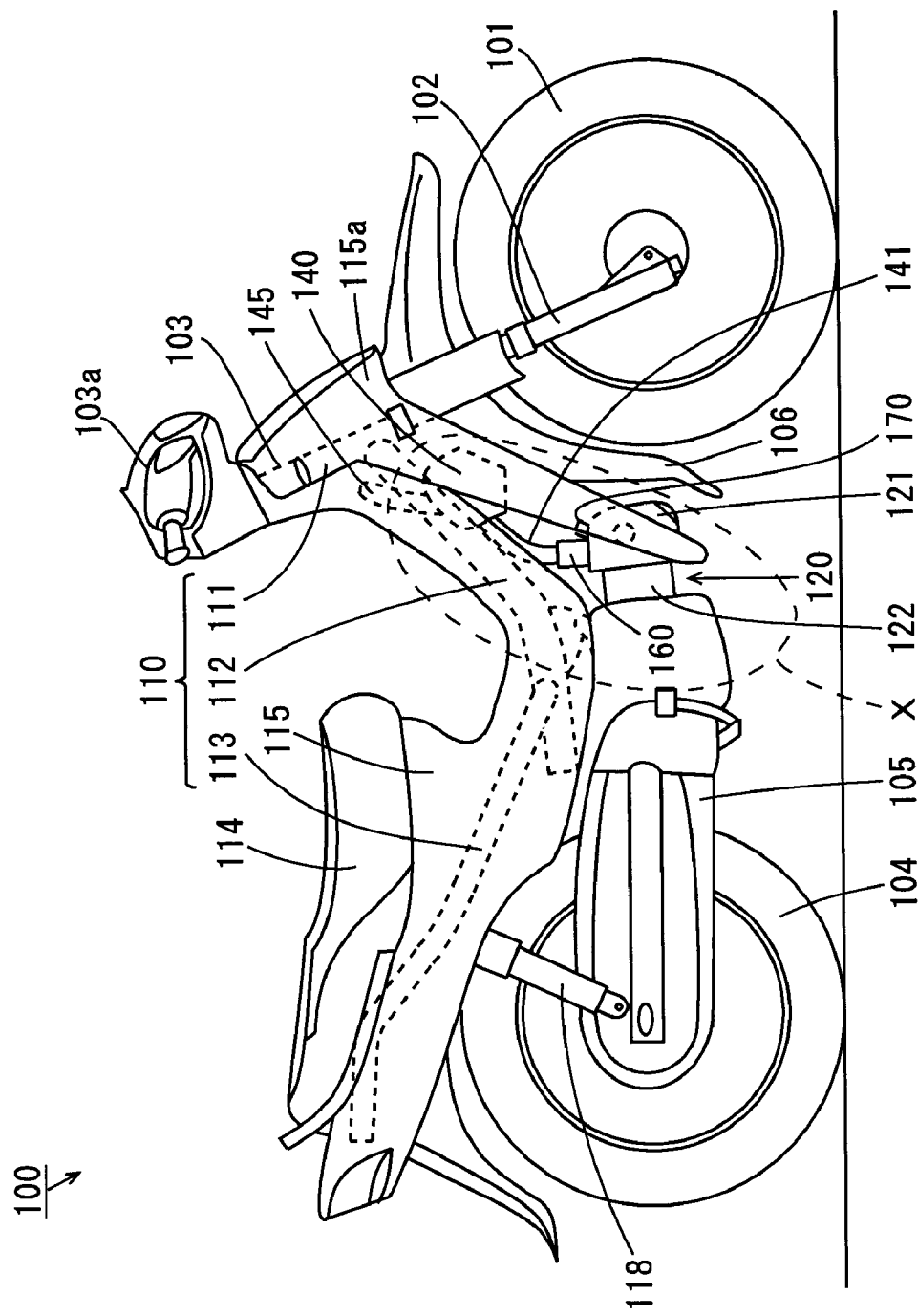
[FIG. 1]

The embodiments of the present invention will be described in detail referring to the drawings. The embodiments below describe a motorcycle as an example of a motor vehicle of the type which a rider straddles.

(1) FIRST EMBODIMENT (a) Entire Structure of Motorcycle

FIG. 1 is a side view of a motorcycle according to a first embodiment of the present invention. It should be noted that, in the description below, the front, rear, left, and right indicate the directions seen from a rider seated on the seat of the motorcycle.

The motorcycle 100 shown in FIG. 1 has an under-bone type body frame (hereinafter referred to simply as a body frame) 110. An air-cooled engine 120 is hung and fixed under a front part of the body frame 110. The body frame 110 is formed of a head pipe 111, a backbone 112, and a seat rail 113.

A steering shaft 103 is attached to the head pipe 111 so that the steering shaft 103 can be turned to the right and left. Handles 103a are attached at the top end of the steering shaft 103. A front fork 102 is connected to the steering shaft 103 to rotatably support a front wheel 101. A fender 106 is attached to cover the front wheel 101 above and behind the front wheel 101.

The head pipe 111 is connected to the backbone 112 that extends rearward and obliquely downward from the head pipe 111. The backbone 112 is aligned with the axis line of the motorcycle 100, i.e., the center line extending from the front to rear of the body.

An air cleaner 140 is provided under the front part of the backbone 112. The air cleaner 140 is connected to the engine 120 through an intake pipe 141. A front cover 115a is extended to cover the front end of the head pile 111 and both sides of the air cleaner 140 and the engine 120.

The seat rail 113, extending rearward and obliquely upward, has its front end connected to the rear end of the backbone 112. A seat 114 is placed above the front part of the seat rail 113. A rear arm 105 is supported under the seat rail 113 with a suspension 118 interposed therebetween. The suspension 118 rotatably supports a rear wheel 104. The body frame 110 is covered by a body cover 115.

The engine 120 is hung and fixed under the rear part of the backbone 112. The engine 120 is thus positioned approximately in the center of the wheel base of the motorcycle 100.

In this embodiment, the engine 120 is a naturally air-cooled, 4-stroke single-cylinder engine. The naturally air-cooled engine 120 can be manufactured at less cost than a water-cooled engine. The engine 120 has a cylinder head 121 and a cylinder block 122. The engine 120 is disposed so that the center axis of the cylinder in the cylinder block 122 extends approximately horizontally and the cylinder head 121 is directed toward the front of the motorcycle 100, with the crankshaft directed in the width direction (right-left direction) of the motorcycle 100.

The cylinder head 121 of the engine 120 is exposed behind the front wheel 101 and under the body cover 115, and the cylinder head 121 is located opposite the rear side of the fender 106. The front cover 115a is secured to both sides of the cylinder head 121 of the engine 120 in some areas. The engine 120 is thus situated under the backbone 112 so that the wind hits the engine 120 in running.

(b) Structure of Engine Suspending

Figure 2:
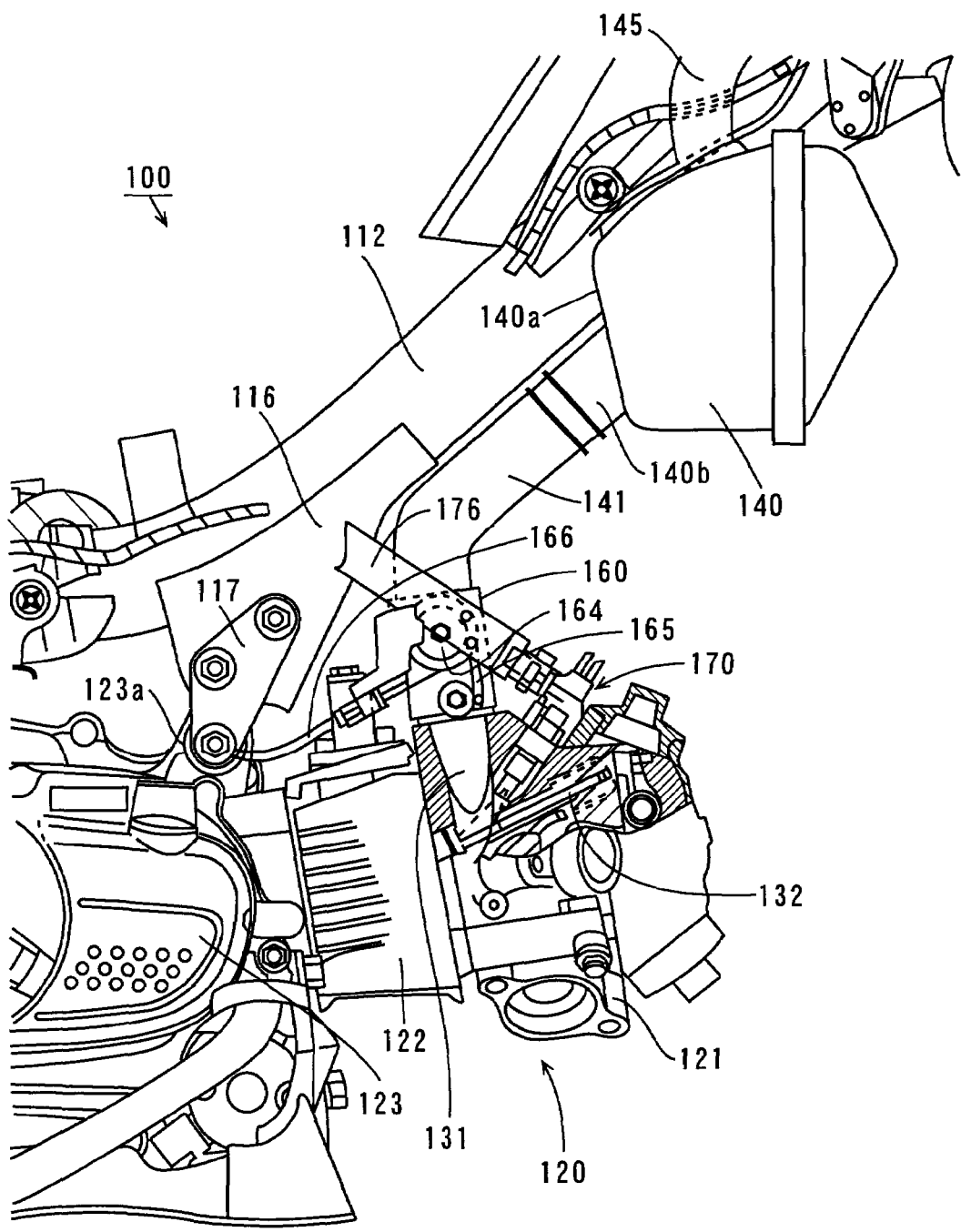
[FIG. 2]

FIG. 2 is an enlarged partially cross-sectional view of the part "X" of the motorcycle 100 of FIG. 1. FIG. 2 shows the intake system of the engine partially in cross-section.

As shown in FIG. 2, a bracket 116 protrudes downward from each side of the rear part of the backbone 112. A crankcase 123 of the engine 120 has a boss 123a formed at the front end of its top wall. The boss 123a of the crankcase 123 is bolted to the bracket 116 with a supporting plate 117 therebetween.

The rear bottom of the crankcase 123 is bolted to a rear arm bracket (not shown) that rockably supports the rear arm 105 shown in FIG. 1. The crankcase 123 contains the crankshaft and a transmission.

(c) Internal Structure of Engine

Figure 3:
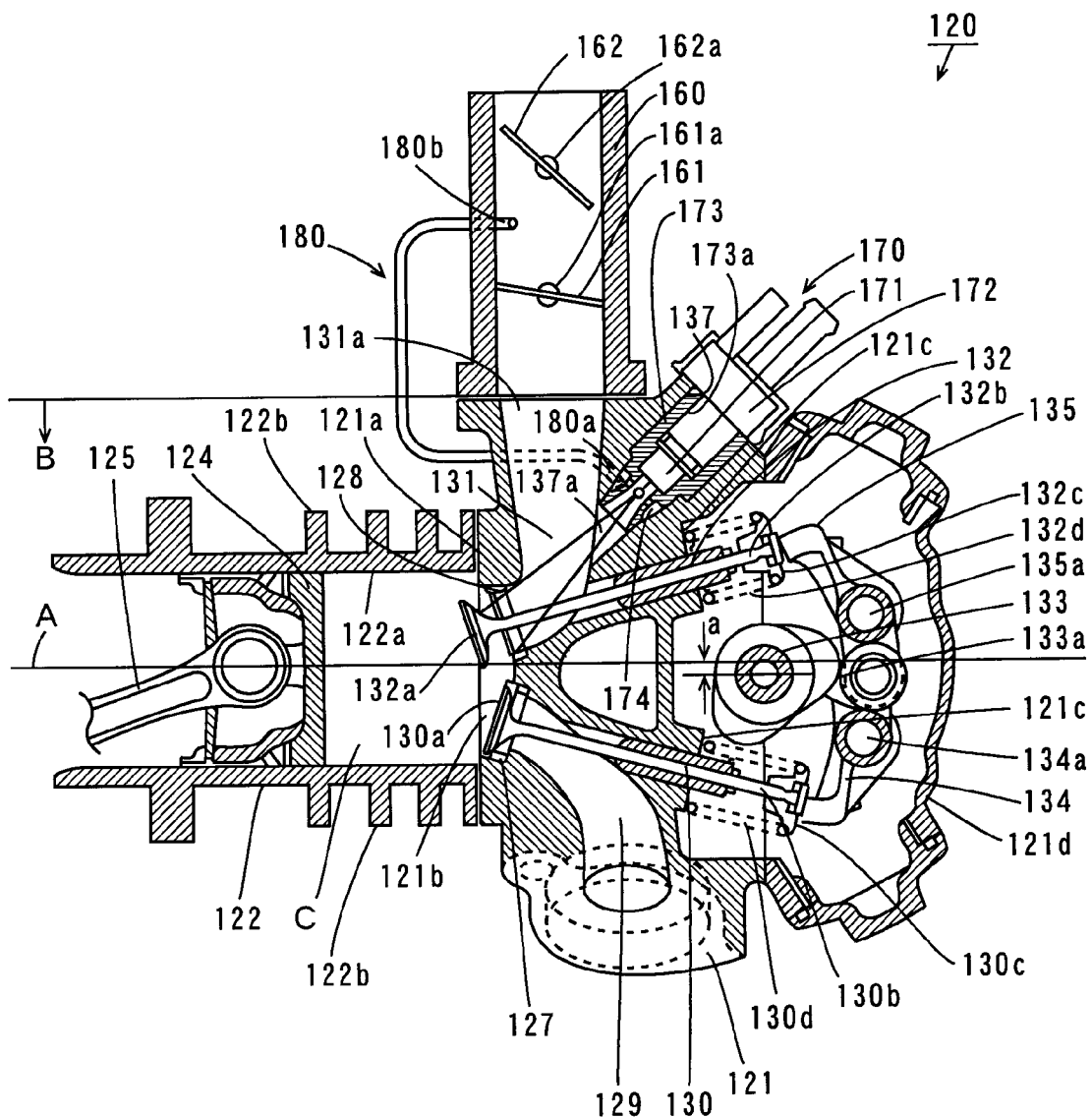
[FIG. 3]
Figure 4:
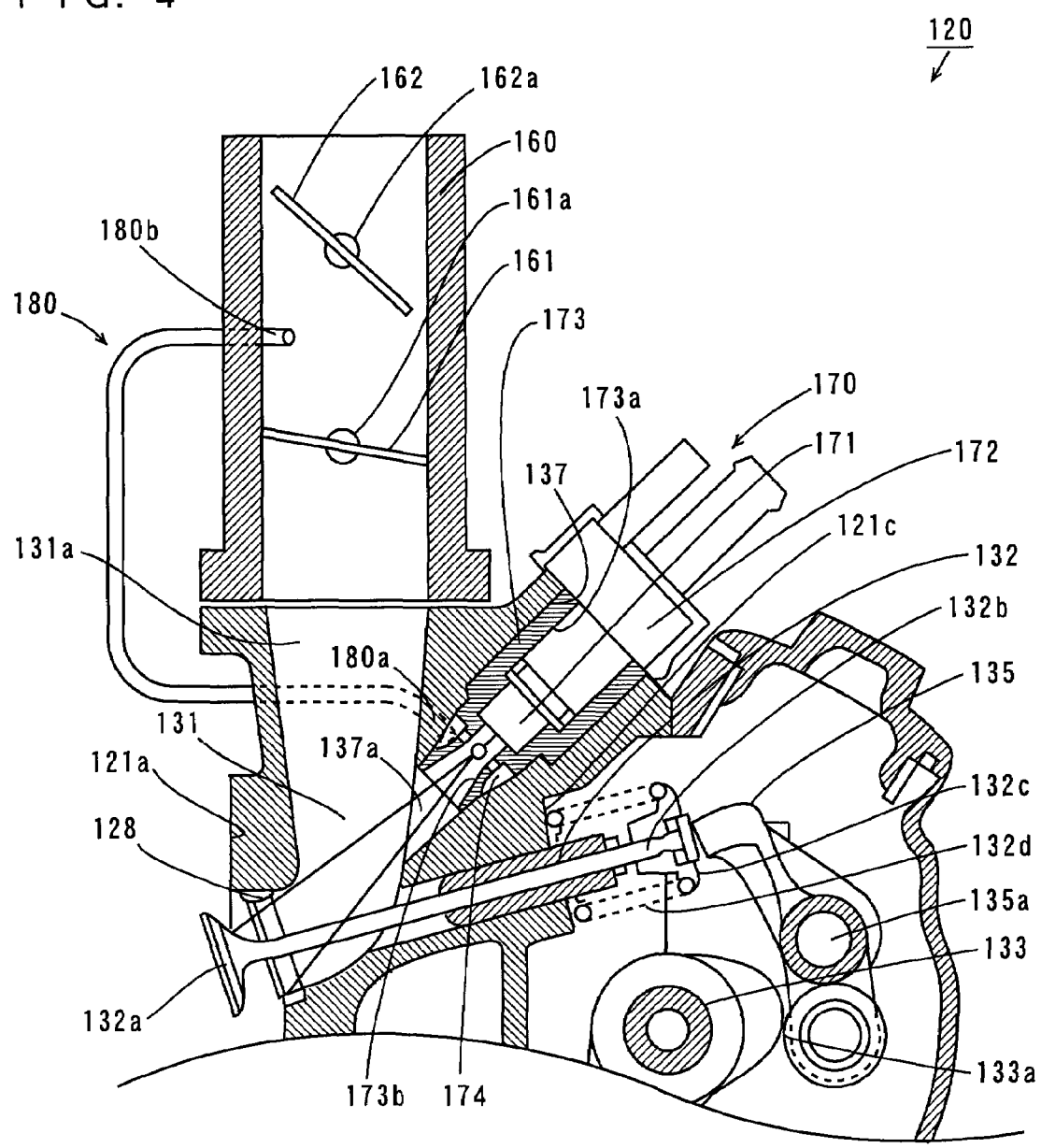
[FIG. 4]

FIG. 3 is a cross-sectional view of the right side of the engine 120 of the motorcycle 100 shown in FIG. 1. FIG. 4 is an enlarged cross-sectional view of a part of the engine 120 of FIG. 3.

The cylinder block 122 and the cylinder head 121 shown in FIG. 3 are integrally coupled to the front wall of the crankcase 123 (see FIG. 2). A cylinder 122a is formed in the cylinder block 122. The central axis of the cylinder 122a is referred to as a cylinder axis line A.

A piston 124 is slidably inserted in the cylinder 122a of the cylinder block 122. The piston 124 is coupled to the crankshaft (not shown) through a connecting rod 125. The outer periphery of the cylinder block 122 has a plurality of outwardly protruding radiation fins 122b. Heat is thus effectively radiated from the peripheral surface of the cylinder block 122. A head cover 121d is attached to the front side of the cylinder head 121.

A combustion recess 121b is formed in the rear side 121a of the cylinder head 121. The combustion recess 121b and the piston 124 in the cylinder 122a form a combustion chamber C. The cylinder head 121 has an exhaust port 129 and an intake port 131. The upper half of the exhaust port 129 branches into two branch passages. Similarly, the lower half of the intake port 131 branches into two branch passages.

The combustion recess 121b has two exhaust valve openings 127 connecting the combustion chamber C and the branch passages of the exhaust port 129 and two intake valve openings 128 connecting the combustion chamber C and the branch passages of the intake port 131. The cross-sections of FIGS. 2 and 3 only show a single exhaust valve opening 127 on the right, a single intake valve opening 128 on the right, and a single fuel injection device 170 on the right. Fuel injection devices are provided respectively in the vicinities of the two branch passages of the intake port 131.

The description below only describes the single exhaust valve opening 127, the single intake valve opening 128, and the single fuel injection device 170.

With the engine 120, the number of intake valve openings, the number of exhaust valve openings, and the number of cylinders 122a are not limited to the numbers shown in this embodiment, but the engine 120 may be provided with any numbers of intake valve openings, exhaust valve openings, and cylinders.

The exhaust port 129 extends obliquely downward from the exhaust valve opening 127 to the bottom of the cylinder head 121. Gas in the combustion chamber C is guided toward the bottom of the cylinder head 121 through each exhaust valve opening 127 and the exhaust port 129.

The cylinder head 121 has an exhaust valve 130 that reciprocates perpendicularly to the exhaust valve opening 127. The exhaust valve 130 has a valve head 130a and a valve stem 130b. The valve head 130a of the exhaust valve 130 opens and closes the exhaust valve opening 127. The valve stem 130b of the exhaust valve 130 is located under the cylinder axis line A in the cylinder head 121 and the valve stem 130b extends obliquely downward preferably at a given angle larger than 0° and smaller than 45° (e.g., 17° to 27°) with respect to the cylinder axis line A.

A retainer 130c is attached to an end of the valve stem 130b and a spring seat 121c is formed in the cylinder head 121. A valve spring 130d is inserted between the retainer 130c and the spring seat 121c of the cylinder head 121. The valve spring 130d energizes the exhaust valve 130 in such a direction that the valve stem 130b is away from the exhaust valve opening 127, i.e., in such a direction that the valve head 130a closes the exhaust valve opening 127.

In the cylinder head 121, the intake port 131 is bent upward from the combustion recess 121b, i.e., the intake port 131 bends from the intake valve opening 128 in a direction approximately perpendicular to the cylinder axis line A (an approximately vertical direction) and extends upward to the top of the cylinder head 121 (see FIGS. 2 and 3).

The intake port 131 forms a part of an intake passage that guides outside air into the combustion chamber C. The intake port 131 has an external connection passage 131a that opens at the top of the cylinder head 121. The external connection passage 131a is connected to a throttle body 160 that also forms a part of the intake passage. Outside air is thus guided from above the cylinder head 121 into the combustion chamber C, through the throttle body 160 and the intake port 131. The throttle body 160 has a first throttle valve 161 and a second throttle valve 162 disposed in this order from downstream.

As shown in FIG. 2, the throttle body 160 is connected to the intake pipe 141 that forms the rest part of the intake passage. The intake pipe 141 extends up from the throttle body 160 and further extends forward and obliquely upward along the lower side of the backbone 112. The air cleaner 140 is situated under the front part of the backbone 112 and behind the head pipe 111 and is bolted to the backbone 112. The rear wall 140a of the air cleaner 140 has a connection passage 140b. One end of the intake pipe 141 is connected to the connection passage 140b of the air cleaner 140.

The air cleaner 140 is connected to a duct 145. As shown in FIG. 1, the duct 145 opens above the front part of the backbone 112 and behind the head pipe 111. Outside air is guided into the air cleaner 140 through the duct 145.

As shown in FIG. 3, the cylinder head 121 has an intake valve 132 that reciprocates perpendicularly to the intake valve opening 128. The intake valve 132 has a valve head 132a and a valve stem 132b. The intake valve opening 128 is opened and closed by the valve head 132a of the intake valve 132. The valve stem 132b of the intake valve 132 is disposed above the cylinder axis line A in the cylinder head 121 and extends obliquely upward preferably at a given angle larger than 0° and smaller than 45° (e.g. 15° to 25°) with respect to the cylinder axis line A.

Seen from the side of the engine 120, the intake valve 132 is positioned approximately symmetrically to the exhaust valve 130 with respect to the cylinder axis line A.

A retainer 132c is attached to the end of the valve stem 132b and a spring seat 121c is formed in the cylinder head 121. A valve spring 132d is inserted between the retainer 132c and the spring seat 121c of the cylinder head 121. The valve spring 132d energizes the intake valve 132 in such a direction that the valve stem 132b is away from the intake valve opening 128, i.e., in such a direction that the valve head 132a closes the intake valve opening 128.

A camshaft 133, for both exhaust and intake, and having a cam 133a, is rotatably disposed between the valve spring 130d of the exhaust valve 130 and the valve spring 132d of the exhaust valve 132 in the cylinder head 121.

An exhaust rocker arm 134 is disposed between the camshaft 133 and the exhaust valve 130. The exhaust rocker arm 134 is rotatably supported, approximately in its center, to the cylinder head 121 by an exhaust rocker shaft 134a. The exhaust rocker shaft 134a is supported by a boss that protrudes on the inner side of the head cover 121d of the cylinder head 121.

An intake rocker arm 135 is disposed between the camshaft 133 and the intake valve 132. The intake rocker arm 135 is rotatably supported, approximately in its center, to the cylinder head 121 by an intake rocker shaft 135a. The intake rocker shaft 135a is supported by a boss that protrudes on the inner side of the head cover 121d of the cylinder head 121.

One end of the exhaust rocker arm 134 and one end of the intake rocker arm 135 are in contact with the cam 133a. Therefore, as the camshaft 133 rotates, the other ends of the exhaust rocker arm 134 and the intake rocker arm 135 respectively press the ends of the valve stems 130b and 132b, thereby moving the valve stems 130b and 132b opposite the energized directions.

Now, the center of the camshaft 133 is displaced by a distance "a" under the cylinder axis line A. The angle between the intake valve 132 and the cylinder axis line A is smaller than the angle between the exhaust valve 130 and the cylinder axis line A. That is to say, the end of the intake valve 132 on the front side is closer to the cylinder axis line A than the end of the exhaust valve 130 on the front side is. This ensures larger space between the intake port 131 and the intake valve 132 in the cylinder head 121.

Utilizing this space, the fuel injection device 170 is situated between the intake port 131 and the intake valve 132, to extend obliquely upward with respect to the engine 120. In this case, the larger space ensured above the intake valve 132 in the cylinder head 121 offers increased freedom in positioning the fuel injection device 170.

(d) Detailed Description of Fuel Injection Device

The fuel injection device 170 has an injection nozzle 171, an injector 172, and a cylindrical holder 173. The injector 172 injects, from the injection nozzle 171, fuel supplied from a fuel tank (not shown) through a supply passage. The injector 172 is located in the area between the intake port 131 and the intake valve 132 and is attached to the cylinder head 121 by the holder 173 in a manner described later. That is, the fuel injection device 170 is positioned on the side of the front wall of the intake port 131.

Seen from the front of the motorcycle 100, the axis line of the fuel injection device 170 is aligned with a center line of the intake port 131. Seen from the side of the motorcycle 100, the fuel injection device 170 is preferably inclined frontward at an angle of 32° to 52° with respect to the cylinder axis line A.

The injector 172 is connected to a fuel supply hose 176 (see FIG. 2). As shown in FIG. 2, the fuel supply hose 176 extends rearward and obliquely upward on the right side of the intake pipe 141 and the backbone 112 to connect to a fuel tank (not shown) through a fuel supply pump (not shown). The fuel supply hose 176 may be disposed on the left side of the intake pipe 141 and the backbone 112.

As shown in FIG. 4, a fitting hole 137 communicating with the intake port 131 is formed in the front wall of the intake port 131. The tip of the injector 172 is inserted in the fitting hole 137 through the holder 173. The injection nozzle 171 at the tip of the injector 172 is thus located proximate to the intake valve opening 128.

The part of the fitting hole 137 that communicates with the intake port 131 forms an injection passage 137a that guides injected fuel from the intake port 131 into the cylinder 122a through the intake valve opening 128.

The intake valve 132 at the intake valve opening 128 is opened when the injector 172 injects fuel. The fuel is thus injected from the injection nozzle 171 directly into the cylinder 122a through the intake valve opening 128.

The timing of injecting fuel from the injector 172 through the intake valve opening 128 is controlled by a controller, such as an ECU (Engine Control Unit).

Now, the positioning and inclination of the fuel injection device 170 will be described. When the valve head 132a of the intake valve 132 is positioned to open the intake valve opening 128, a circular gap forms between the intake valve opening 128 and the valve head 132a. The fuel injection device 170 is positioned and inclined so that a mixture of fuel and atomizing air injected from the fuel injection device 170 flows into the circular gap mainly in the area closer to the cylinder axis line A and passes along the inner surface of the cylinder 122a closer to the exhaust valve opening 127 and along the cylinder axis line A.

That is to say, the fuel injection device 170 is located in the cylinder head 121 at such an angle that the fuel injecting port of the injection nozzle 171 is directed toward the intake valve opening 128 and such that the fuel-air mixture injected from the fuel injecting port causes air motion, such as tumble, within the cylinder 122a.

Seen from the horizontal direction, the fuel injection device 170 is disposed so that the injection nozzle 171 is positioned within the region defined by connecting the front end of the valve stem 132b with the valve head 132a closing the intake valve opening 128, the intersection point of the axis of the intake valve 132 and the center line of the intake port 131, and the intersection point of the center line of the intake port 131 and the external connection passage 131a at the upstream end of the intake port 131. Also, the fuel injection device 170 is placed opposite the fender 106 shown in FIG. 1 and can be viewed from obliquely ahead of the motorcycle 100 and from the side of the motorcycle 100.

It is preferable to fix the fuel injection device 170 in the cylinder head 121 such that the distance from the intake valve opening 128 to the tip of the injection nozzle 171 is 4.0 cm or less.

Now, the detailed structure of the fuel injection device 170 and the holder 173 will be described. As shown in FIG. 4, the holder 173 has an axially extending supporting hole 173a and a cylindrical injecting port 173b that connects with the supporting hole 173a. The injecting port 173b has an internal diameter smaller than that of the supporting hole 173a.

The injection nozzle 171 of the injector 172 is inserted and fitted in the supporting hole 173a of the holder 173. The injection nozzle 171 is thus located between the axis of the intake valve 132 and the center line of the intake port 131 and proximate to the inner front wall of the intake port 131.

Fuel injected from the injection nozzle 171 of the injector 172 is mixed with atomizing air in the injecting port 173b and is supplied from the injecting port 173b into the combustion chamber C through the branch passage of the intake port 131.

The outer peripheral surface of the injecting port 173b of the holder 173 has a portion of a reduced external diameter that forms a circular recess. This forms an air chamber 174 of a circular cavity between the circular recess of the holder 173 and the inner surface of the fitting hole 137. The air chamber 174 is connected with a downstream end opening 180a of a secondary intake passage (hereinafter referred to as a secondary passage) 180 that branches off from the throttle body 160. The secondary passage 180 extends upstream along the intake port 131, and the secondary passage 180 has an upstream end opening 180b that communicates with the space between the first throttle valve 161 and the second throttle valve 162 in the throttle body 160.

(e) Structure of Injecting port of Fuel Injection Device and Its Vicinity

Figure 5A:
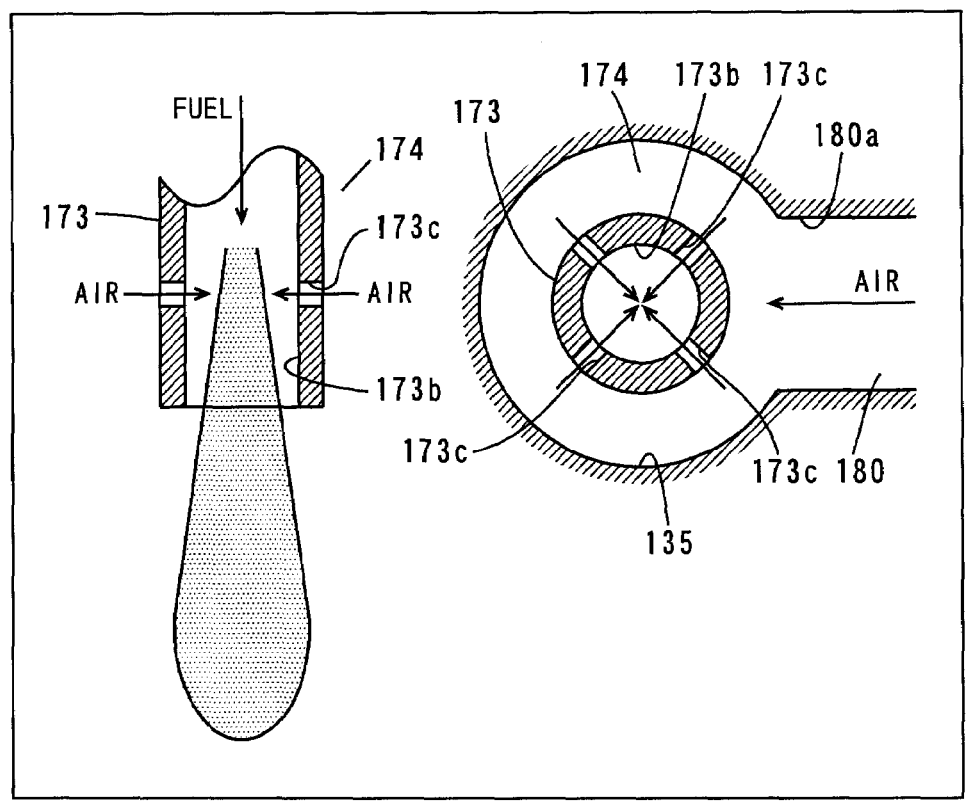
[FIG. 5a]
Figure 5B:
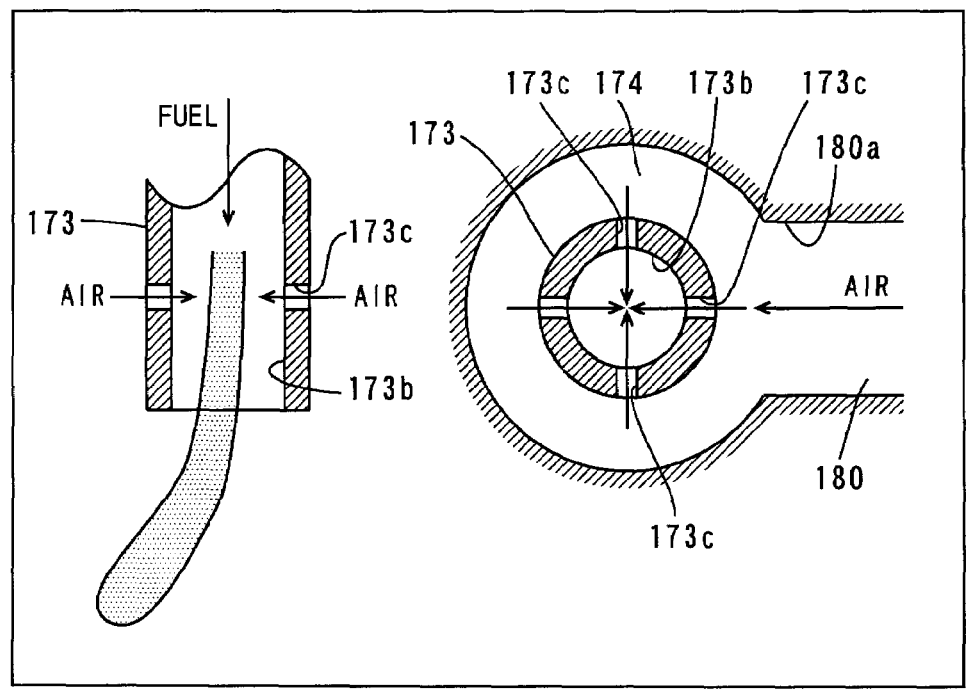
[FIG. 5b]

FIG. 5a is a cross-sectional view of the injecting port 173b of the holder 173 of the embodiment. FIG. 5b is a cross-sectional view of the injecting port 173b of the holder 173 of FIG. 5a, but where communicating holes are positioned differently. FIGS. 5a and 5b show vertical cross-sections on the left and transverse cross-sections on the right.

As shown in FIG. 5a, the holder 173 has a plurality of communicating passages 173c formed at equal angular intervals and radially passing through the wall. In this embodiment, the holder 173 has four communicating passages 173c. The air chamber 174 thus communicates with the inside of the injecting port 173b through the plurality of communicating passages 173c.

The air chamber 174 also communicates with the downstream end opening (connection passage) 180a of the secondary passage 180, near the injection nozzle 171 (see FIG. 3).

Now, among the four communicating passages 173c, the two communicating passages 173c located closer to the downstream end opening 180a have their axis lines inclined 45° with respect to the axis line of the downstream end opening 180a. That is to say, the communicating passages 173c are misaligned with the axis line of the downstream end opening 180a. Therefore, the downstream end opening 180a of the secondary passage 180 is directed toward the peripheral surface of the holder 173. Accordingly, air emitted from the downstream end opening 180a does not flow directly into the injecting port 173b, but it moves in the air chamber 174 and then flows into the injecting port 173b from the individual communicating passages 173c.

This prevents distorted flow of the mixture of injected fuel and atomizing air, making it possible to direct the mixture gas in a desired direction.

In contrast, as shown in FIG. 5b, if the axis line of the communicating passage 173c located close to the downstream end opening 180a is aligned with the axis line of the downstream end opening 180a, then a larger amount of air flows into the communicating passage 173c close to the downstream end opening 180a, as compared with the amounts of air flowing into the remaining communicating passages 173c. This causes the mixture gas to flow away from the downstream end opening 180a. Then, the mixture gas cannot be directed in the desired direction.

(f) Control of First and Second Throttle Valves and Air Flow Rates

As shown in FIG. 2, a driving pulley 164 is attached to the external surface of the throttle body 160. In the throttle body 160, the driving pulley 164 is fixed to the valve stem 162a of the second throttle valve 162 shown in FIG. 3. The driving pulley 164 is coupled with one end of a throttle operating cable 166. The other end of the throttle operating cable 166 is coupled to a throttle grip of the handle 103a shown in FIG. 1.

The driving pulley 164 coupled to the second throttle valve 162 shown in FIG. 3 and the first throttle valve 161 are coupled through a link-type delay mechanism 165 shown in FIG. 2.

The open degree of the first throttle valve 161 and the second throttle valve 162 is controlled as follows according to variation of the load placed on the engine 120. It is thought that the amount of throttle operation made by the rider (the amount of throttle grip operation) is approximately proportional to the load placed on the engine 120.

Figure 6:
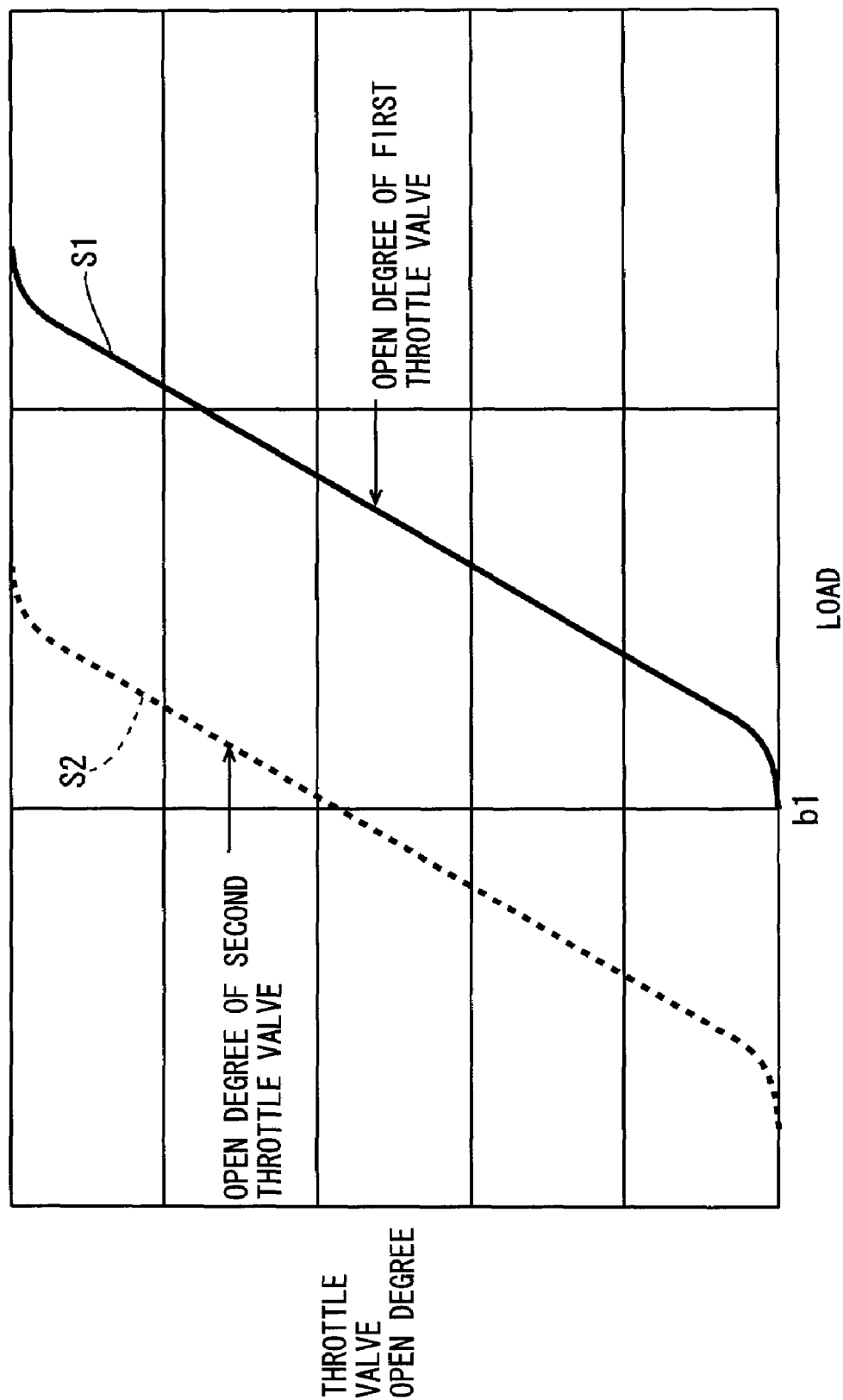
[FIG. 6]
Figure 7:
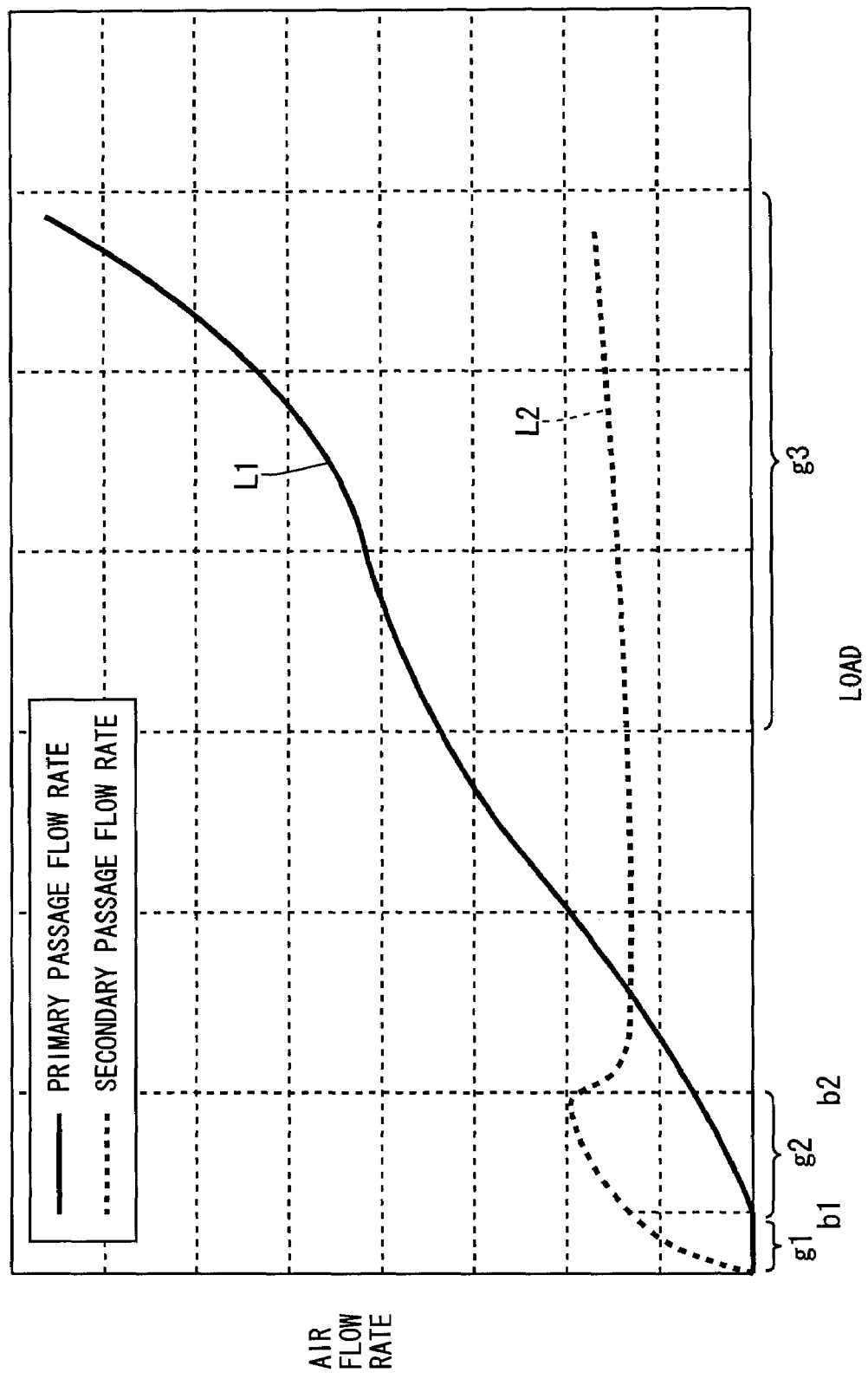
[FIG. 7]

FIG. 6 is a diagram showing a relation between the load and throttle open degree. FIG. 7 is a diagram showing a relation between the load and air flow rates.

In FIG. 6, the horizontal axis shows the load placed on the engine 120 and the vertical axis shows the open degree of the first throttle valve 161 and the open degree of the second throttle valve 162. In FIG. 6, the solid line S1 shows a variation of the open degree of the first throttle valve 161 and the broken line S2 shows a variation of the open degree of the second throttle valve 162. In FIG. 7, the horizontal axis shows the load placed on the engine 120 and the vertical axis shows air flow rates in the primary passage and the secondary passage 180. The primary passage corresponds to the passage in the intake port 131. In FIG. 7, the solid line L1 shows the air flow rate in the primary passage and the broken line L2 shows the air flow rate in the secondary passage 180.

As shown in FIG. 6, the first throttle valve 161 located downstream is kept approximately full closed in the low-load driving region (partial load driving region) that ranges from no-load (idling) to a first load value b1. The wording "a throttle valve is approximately full closed" means that the throttle valve is at an angle of 5° or less with respect to the angle at which the throttle valve is in contact with the inner surface of the throttle body 160.

The second throttle valve 162 located upstream opens and closes in accordance with the amount of throttle operation to control the sectional area of the air pass in the primary passage. In the low-load driving region, the negative pressure in intake strokes of the engine 120 directly affects the secondary passage 180 and the total amount of air taken in from the duct 145 of the air cleaner 140 is introduced into the air chamber 174 through the throttle body 160 and the secondary passage 180.

Next, the air introduced in the air chamber 174 is supplied into the injecting port 173b through the communicating passages 173c shown in FIG. 5a, where the air is sufficiently mixed with fuel injected from the injection nozzle 171, while atomizing the fuel. The mixture gas is then supplied into the cylinder 122a from the right and left intake valve openings 128.

In this case, the open degree of the second throttle valve 162 increases as the amount of throttle operation (load) increases. Therefore, as shown in FIG. 7, the air flow rate in the secondary passage 180 increases as the load increases.

Thus, a large amount of air (assist air) is supplied from the throttle body 160 to the secondary passage 180 and further to the air chamber 174 and the injecting port 173b of the fuel injection device 170. This promotes atomization of the fuel injected from the fuel injection device 170. Also, the assist air cools the tip of the injector 172 (the vicinity of the injection nozzle 171).

In this way, while the first throttle valve 161 is full closed, the open degree of the second throttle valve 162 is controlled to supply a proper amount of assist air to the vicinity of the tip of the injector 172.

In the normal driving region in which the load is larger than the first value b1, it is difficult to run the engine 120 only with the air supplied from the secondary passage 180. Therefore, as shown in FIG. 6, the first throttle valve 161 is opened, and as shown in FIG. 7, air is supplied to the fuel injection device 170 also from the primary passage. The assist air cools the tip of the injector 172 and atomizes injected fuel also in the normal driving region.

As the open degree of the first throttle valve 161 increases, air flows into the cylinder 122a from the throttle body 160 through the intake port 131. When the load exceeds a second value b2, the air flow rate in the secondary passage 180 decreases as shown in FIG. 7 because of a difference between the pressure in the intake port 131 and the pressure in the secondary passage 180. In the high-load driving region, the air flow rate in the secondary passage 180 is considerably lower than the air flow rate in the primary passage.

Increasing the open degree of the first throttle valve 162 necessarily means that the motorcycle 100 runs at higher speed. Therefore, the fuel injection device 170 is naturally cooled by the head wind in running, while a small amount of assist air is supplied to the vicinity of the tip of the injector 172.

(g) Relation between Injector Tip Temperature and Assist Air Flow Rate

Figure 8:
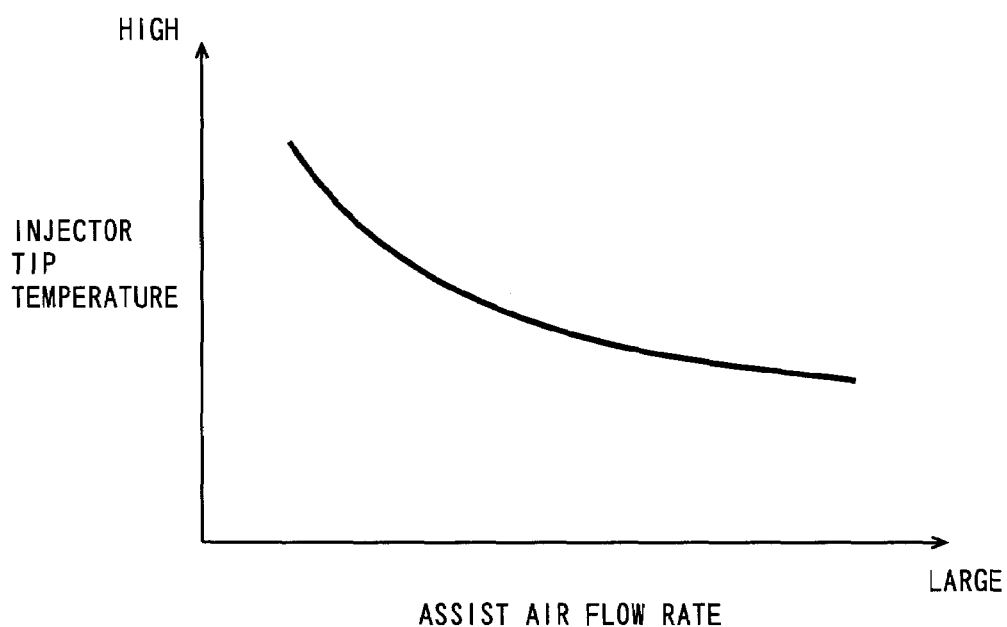
[FIG. 8]

FIG. 8 is a diagram showing a relation between the temperature at the tip of the injector 172 and the flow rate of assist air.

As shown in FIG. 8, the temperature of the tip of the injector 172 decreases as the assist air flow rate increases. Thus, the tip of the injector 172 is sufficiently cooled in the low-load driving region where the assist air flow rate is large. Preferably, the amount of air supplied to the injector 172 is about 1 L/sec or more.

(h) Relation between Air Flow Rate in Secondary Passage and Engine Strokes

Figure 9:
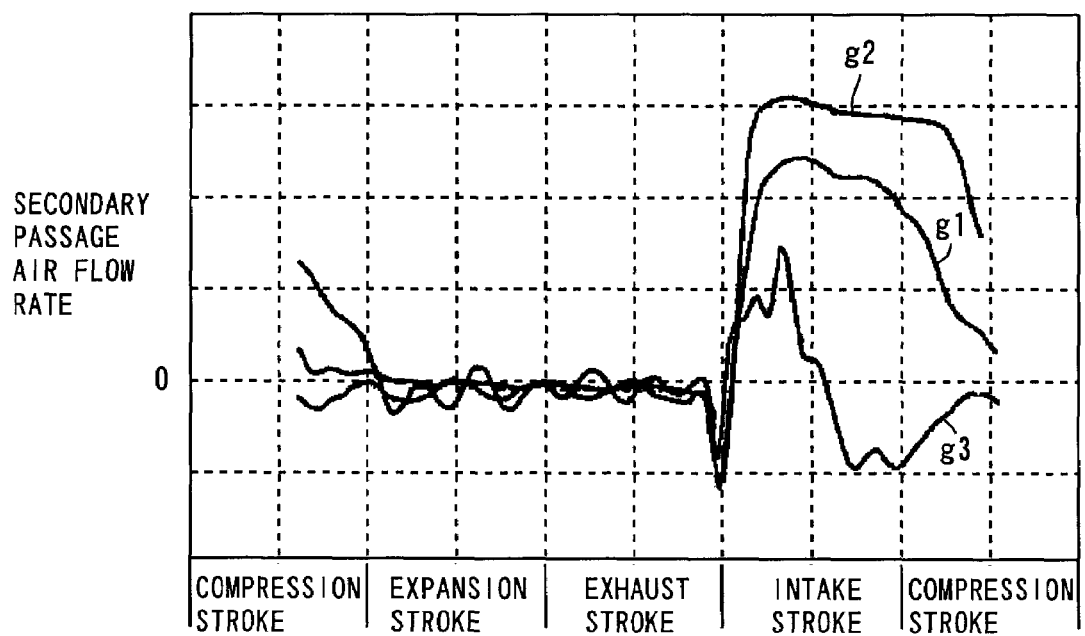
[FIG. 9]

FIG. 9 is a diagram showing a relation between the air flow rate in the secondary passage and engine strokes. In FIG. 9, the curve g1 shows an air flow rate in the secondary passage 180 that flows when the load placed on the engine 120 is smaller, i.e., when the engine 120 is idling or running with a lower load. The curve g2 shows an air flow rate in the secondary passage 180 that flows when the engine 120 is normally running. The curve g3 shows an air flow rate in the secondary passage 180 that flows when the load on the engine 120 is larger, i.e., when the engine 120 is running with a higher load (e.g., when the first throttle valve 161 and the second throttle valve 162 are full open).

When the load on the engine 120 is small, the first throttle valve 161 is closed, and so all the air used to run the engine 120 in an intake stroke flows into the cylinder 122a through the secondary passage 180. Then, the assist air is supplied into the air chamber 174 and the injecting port 173b of the fuel injection device 170 at the flow rate shown by the curve g1. The tip of the injector 172 is thus cooled with a large amount of assist air when the motorcycle 100 is running at a low speed and is hence hit by less wind.

As the load on the engine 120 increases, assist air is supplied to the air chamber 174 and the injecting port 173b of the fuel injection device 170 at the air flow rate shown by the curve g2. That is, the amount of assist air supplied to the air chamber 174 and the injecting port 173b of the fuel injection device 170 increases in proportion to the open degree of the second throttle valve 162.

When the engine 120 runs with a higher load, the first throttle valve 161 is opened and air is supplied also from the primary passage. Then, as shown by the curve g3, the flow rate of assist air supplied to the air chamber 174 and the injecting port 173b of the fuel injection device 170 decreases. In this case, the fuel injection device 170 is cooled by the head wind in running.

(i) Variation of Injector Tip Temperature After Engine Stop

Figure 10:
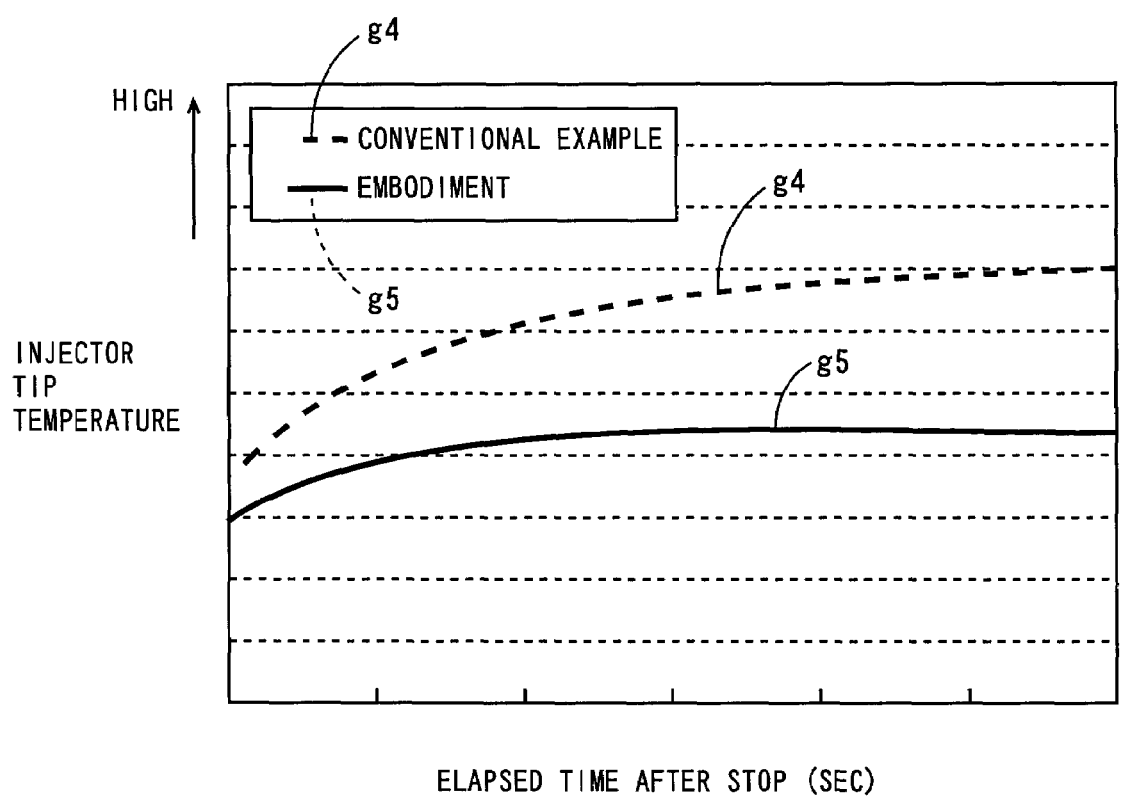
[FIG. 10]

FIG. 10 is a diagram showing variations of the temperature of the tip of the injector that are exhibited when the engine is stopped immediately after the motorcycle has run with a high load.

Figure 14:
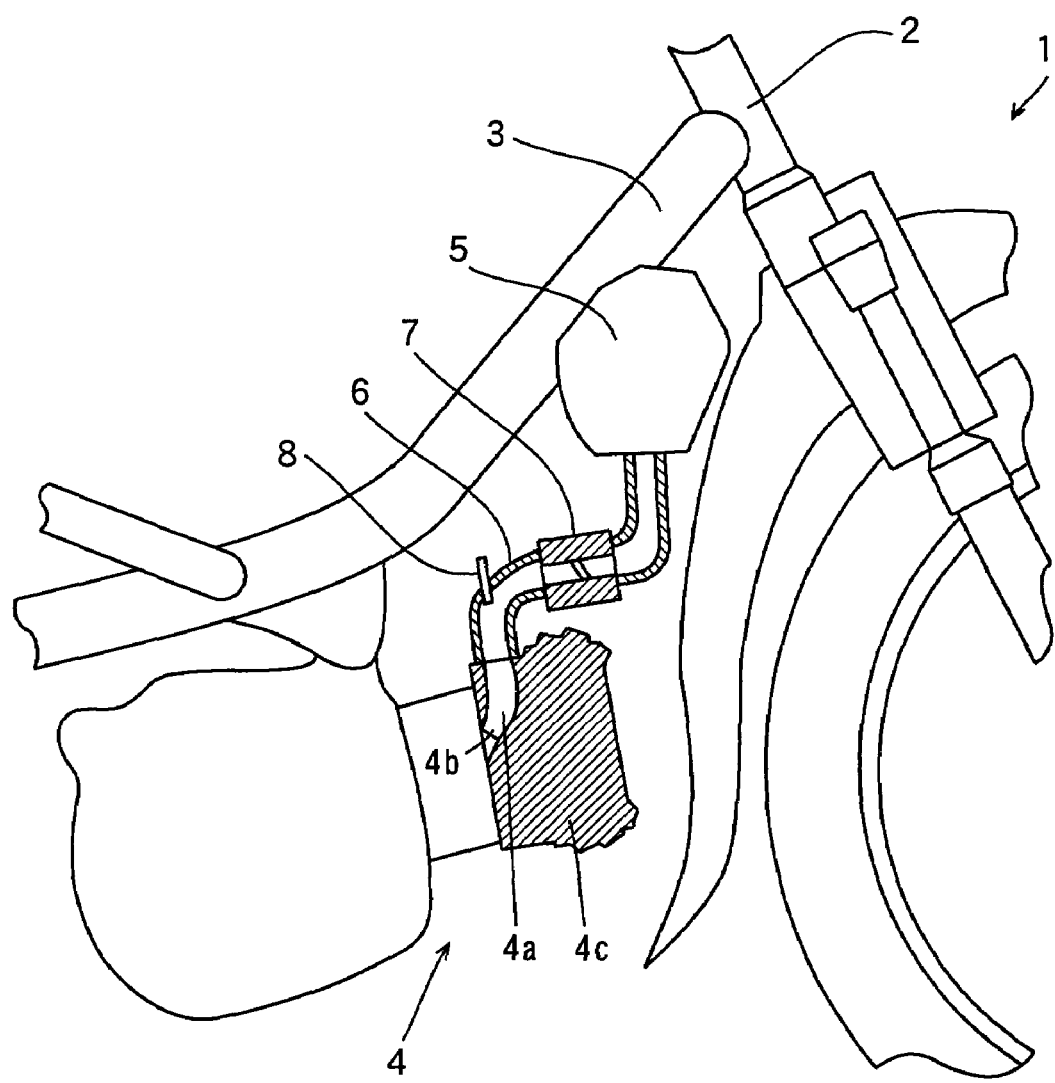
[FIG. 14]

In FIG. 10, the broken line g4 shows a variation of the injector tip temperature of the fuel injection device 8 of the conventional motorcycle 1 shown in FIG. 14, and the solid line g5 shows a variation of the tip temperature of the injector 172 of the fuel injection device 170 of the motorcycle 100 of the embodiment.

As shown in FIG. 10, with the conventional motorcycle 1, the temperature of the tip of the injector 172 increases because the injector is heated by the engine 4 after the stop. In contrast, with the motorcycle 100 of the embodiment, the temperature of the tip of the injector 172 is kept lower because the injector 172 and its vicinity are cooled by the assist air and wind. This prevents formation of vapor in the fuel.

(j) Effects of the First Embodiment

According to the motorcycle 100 of the embodiment, assist air is guided to the air chamber 174 and the injecting port 173b of the fuel injection device 170 through the secondary passage 180 while the air-cooled engine 120 is idling or running with low load. This atomizes the fuel injected from the fuel injection device 170 and cools the vicinity of the tip of the injector 171 of the fuel injection device 170 while the motorcycle 100 is stopped or running at low speed.

The air-cooled engine 120 is situated under the backbone 112 that curves and inclines rearward and obliquely downward from the head pipe 111, with the cylinder axis line A extending in the front-to-rear direction. In this case, the cylinder head 121 is located in the front and the cylinder block 122 is located in the rear. The fuel injection device 170 is disposed in the cylinder head 121 so that its one end is exposed in the front. This allows the fuel injection device 170 to be cooled by the wind that hits the cylinder head 121 while the engine 120 is running normally or with high load. The cooling effect by the wind is especially noticeable when the motorcycle 100 runs at high speed, while the assist air flow rate is low.

Thus, the fuel injection device 170 is prevented from being heated to high temperature by the engine 120 while the motorcycle 100 is idling or running. This prevents formation of vapor in the fuel injected by the fuel injection device 170, thus preventing problems due to vapor, such as vapor lock and breathing. Preventing the formation of vapor also prevents deterioration of re-startability.

Also, because the vicinity of the tip of the injector 171 of the fuel injection device 170 is thus cooled by the assist air for fuel atomization while the engine 120 is idling or running with low load, and also because the fuel injection device 170 is naturally cooled by the wind that hits the cylinder head 121 while the engine 120 is running normally or running with high load, there is no need to use an expensive part such as a solenoid, or a special cooling device and special control, and there is no need for complicated control of the assist air through the secondary passage 180. Thus, the fuel injection device 170 can be cooled with a simple structure and at low cost.

Also, in running at low speed, a large amount of assist air is supplied to the air chamber 174 and the injecting port 173b of the fuel injection device 170, where by the vicinity of the tip of the injector 171 of the fuel injection device 170 is effectively cooled at low cost by the assist air.

Also, effectively cooling the fuel injection device 170 in this way in idling or running removes the need to locate the fuel injection device 170 at a distance from the engine 120 to avoid heat from the engine 120. For example, there is no need to locate the fuel injection device 170 at a distance above the engine 120. This allows the provision of only the intake system including the throttle body 160 and the intake pipe 141 between the engine 120 and the backbone 112 thereabove. In this case, it is easy to ensure a space for the throttle body 160 between the upper wall of the cylinder head 121 and the backbone 112.

Furthermore, the intake pipe 141 is bent just once, with an increased radius of curvature, which reduces intake resistance.

In particular, because the throttle body 160 is connected between the intake port 131 and the intake pipe 141, it is possible to take in air into the cylinder 122a through the intake valve opening 128 with a quick response to the opening/closing of the first throttle valve 161 and the second throttle valve 162 in the throttle body 160. The response of the engine 120 to the throttle operation is thus considerably improved.

Also, the injection nozzle 171 and the injecting port 173b of the fuel injection device 170 are disposed between the axis of the intake valve 132 and the center line of the intake port 131, with the injection nozzle 171 and the injecting port 173b located proximate to the intake valve opening 128 and directed toward the intake valve opening 128. Therefore, the distance between the injection nozzle 171 of the fuel injection device 170 and the intake valve opening 128 is short and hence the fuel transport distance is short. Thus, the fuel atomization is improved by the assist air through the secondary passage 180, and the flow of the mixture gas in the cylinder 122a is also promoted.

Furthermore, cooling the vicinity of the tip of the injector 171 of the fuel injection device 170 with assist air allows the injection nozzle 171 of the fuel injection device 170 to be positioned closer to the valve head 132a of the intake valve 132. Thus, the distance from the tip of the injection nozzle 171 of the fuel injection device 170 to the intake valve opening 128 can be as short as 4 cm or less.

Then, the fuel injected from the injection nozzle 171 is mixed with air and the mixture gas is injected directly into the intake valve opening 128. Therefore, the area of the wall surface that fuel may adhere to is so small that the fuel guided into the combustion chamber C through the intake valve opening 128 hardly adheres to the wall surface. This certainly prevents the problem that fuel adhering on the wall surface enters the cylinder 122a regardless of control of the fuel injection device 170. This allows high-precision fuel injection control and considerably improves fuel consumption. This also satisfactorily alleviates deterioration of exhaust gas condition which is caused by exhaust of unburned fuel when fuel supply is stopped or when idling is stopped, thereby preventing deterioration of exhaust gas caused by variations of the air/fuel ratio (A/F) during transitions. Furthermore, the response of rotating speed of the engine 120 to the throttle operation is further improved. Therefore, the rotating speed of the engine 120 is increased without delay even when the throttle is quickly operated.

Also, the mixture gas flows into the circular gap between the intake valve opening 128 and the valve head 132a of the intake valve 132 mainly through an area closer to the exhaust valve opening 127 and flows along the inner surface of the cylinder 122a and in the axial direction. This certainly causes tumble (vertical whirl) in the cylinder 122a. The fuel atomization mentioned above and the occurrence of tumble considerably improve combustibility.

Also, locating the intake port 131 approximately uprightly from the intake valve opening 128 and the axis of the intake valve 132 approximately in the front-to-rear direction makes it possible to ensure a space for the fuel injection device 170 between the intake port 131 and the intake valve 132, without enlarging the cylinder head 121.

In particular, the camshaft 133 is shifted by a distance "a" under the cylinder axis line A and the angle between the cylinder axis line A and the axis of the intake valve 132 is smaller than the angle between the cylinder axis line A and the axis of the exhaust valve 130, and the intake valve 132 is closer to the cylinder axis line A than the exhaust valve 130 is. This ensures a sufficient space to locate the fuel injection device 170 close to the intake valve opening 128, between the intake port 131 and the intake valve 132 in the cylinder head 121. This makes it possible to reduce fuel adhesion to the wall surface, improves the response of the engine 120 to the throttle operation, and satisfactorily enhances combustibility, without a need to enlarge the cylinder head 121.

Also, the portion in the throttle body 160 between the first throttle valve 160 and the second throttle valve 162 communicates with the air chamber 174 in the fuel injection device 170 through the secondary passage 180, and the first throttle valve 161 is kept approximately full closed in the low-load driving region that ranges from no-load to the first load value. Therefore, a large amount of assist air is certainly supplied into the air chamber 174 and the injecting port 173b. This sufficiently promotes fuel atomization.

Also, the fuel injection device 170 is positioned close to the intake valve opening 128 in the cylinder head 121 and situated so that the fuel injection device 170 does not interfere with the intake pipe 141. Therefore, the fuel injection device 170 does not interfere with the backbone 112 when the engine 120 is hung and fixed under the backbone 112. Thus, the fuel injection device 170 does not reduce freedom in hanging and fixing the engine 120 under the backbone 112.

Also, arranging the intake pipe 141 along the lower side of the backbone 112 and locating the fuel supply hose 176 on the same side as the intake pipe 141 simplifies the piping structure of the intake system and the fuel supply system.

Also, locating the engine 120 under the backbone 112 allows a rider to easily straddle the seat 114.

(2) SECOND EMBODIMENT

Figure 11:
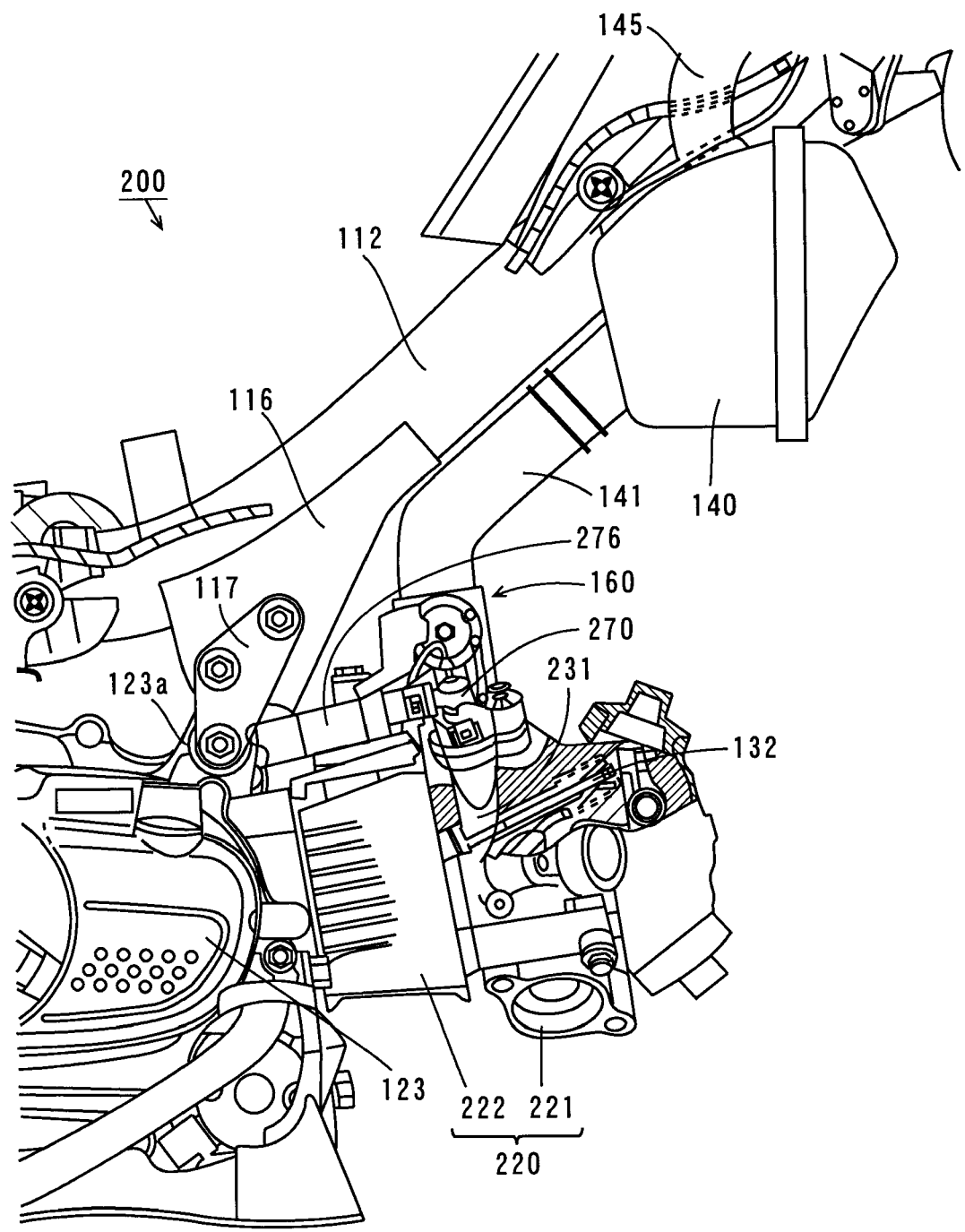
[FIG. 11]
Figure 12:
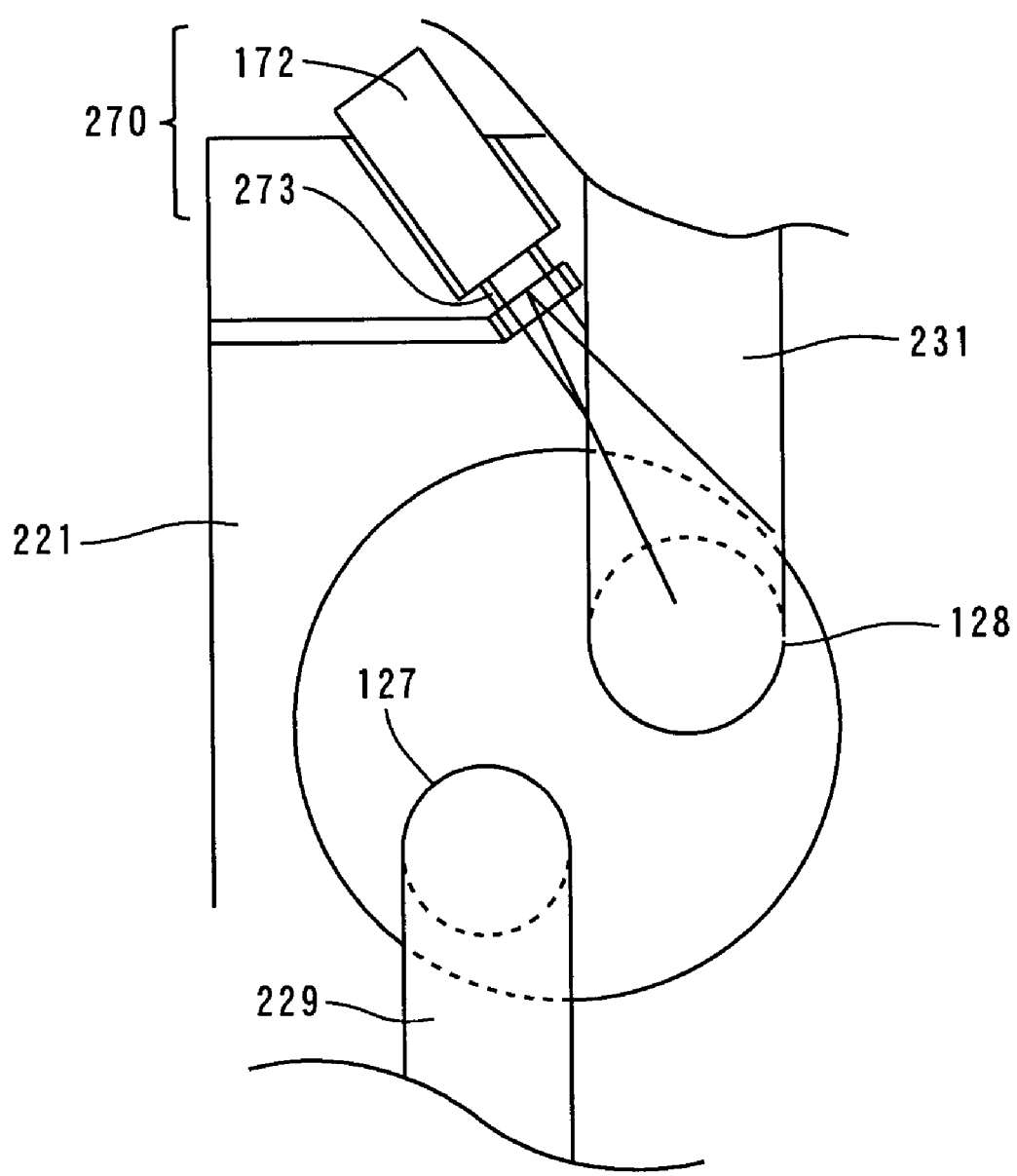
[FIG. 12]

FIG. 11 is an enlarged partially cross-sectional view showing the engine of a motorcycle according to a second embodiment of the present invention. FIG. 12 is a diagram showing the structure of a main part of the engine of FIG. 11 seen from the front.

The motorcycle 200 of the embodiment has the same basic structure as the motorcycle 100 of the first embodiment except in the following respects. In FIGS. 11 and 12, the same components as those depicted in FIGS. 1 and 2 are shown at the same reference numerals.

As shown in FIGS. 11 and 12, the motorcycle 200 of the second embodiment differs from the motorcycle 100 of the first embodiment in the positioning of a fuel injection device 270 and in that a single exhaust valve opening 127 and a single intake valve opening 128 are provided.

In the motorcycle 200 of the second embodiment, as in the motorcycle 100 of the first embodiment, an air-cooled engine 220 is hung and fixed under a backbone 112, with the cylinder axis line extending approximately horizontally in the front-to-rear direction. With the engine 220, the number of exhaust valve openings, the number of intake valve openings, and the number of cylinders are not limited to the numbers shown in this embodiment.

A cylinder head 221 of the engine 220 has an intake port 231 that communicates with the intake valve opening 128 and that extends upward from the intake valve opening 128 approximately vertically with respect to the cylinder axis line. The cylinder head 221 also has an exhaust port 229 that communicates with the exhaust valve opening 127.

The fuel injection device 270 is disposed on a side of the intake port 231 (in this embodiment, on the right side seen from the rider) so that the fuel injection device 270 injects fuel from the inner wall on the side of the intake port 231.

The fuel injection device 270 of this embodiment has a structure, functions, and effects that are similar to those of the fuel injection device 170 of the first embodiment. As shown in FIG. 11, the fuel injection device 270 is supplied with fuel by a fuel pump from a fuel tank through a fuel supply hose 276.

A secondary passage branches off from a portion of the throttle body 160 between a first throttle valve and a second throttle valve and is connected to an injecting port of a holder attached at the tip end of the fuel injection device 270.

With this engine 220, the fuel injection device 270 is positioned in the cylinder head 221 to inject fuel from the side directly toward the intake valve opening 128 and the fuel injection device 270 can be viewed from the front of the motorcycle 200.

In this engine 220, the fuel injection device 270 has an injector 172 similar to that of the first embodiment, but the shape of the holder 273 and the position of the fitting hole formed in the cylinder head 221 differ.

When the motorcycle 200 of this embodiment runs, the wind directly hits both of the engine 220 and the fuel injection device 270, whereby the fuel injection device 270 is cooled according to the running speed.

As in the first embodiment, when the engine 220 idles or runs with a low load, assist air supplied through the secondary passage cools the tip of the injector 172 of the fuel injection device 270. This prevents formation of vapor in the fuel injected from the fuel injection device 270 and reduces occurrence of troubles of the engine 220.

(3) CORRESPONDENCE BETWEEN ELEMENTS OF CLAIMS AND COMPONENTS OF THE EMBODIMENTS

In the embodiments above, the backbone 112 corresponds to a main frame, the intake port 131 corresponds to an primary passage, the exhaust port 129 corresponds to an exhaust passage, the first throttle valve 161 corresponds to a first opening/closing mechanism, the second throttle valve 162 corresponds to a second opening/closing mechanism, the holders 173 and 273 correspond to a cylindrical member, and the communicating passages 173c correspond to a passage or passages.

(4) OTHER EMBODIMENTS

The positioning of the fuel injection device 170 in the cylinder head 121 is not limited to those shown in the embodiments. The fuel injection device 170 is positioned so that, seen from above, the tip of the injection nozzle 171 is located further forward than the rear of the top of the intake port 131.

Figure 13:
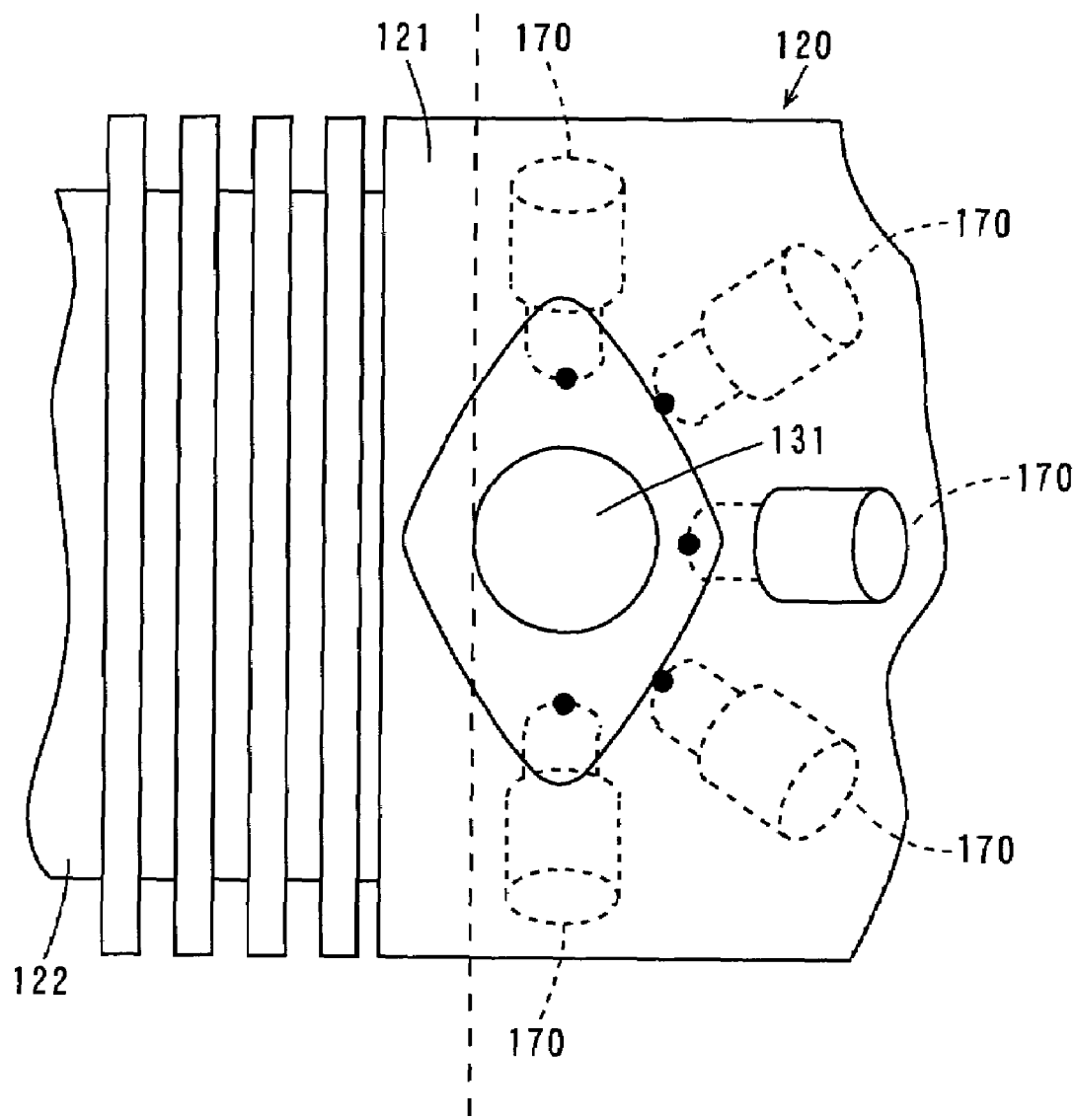
[FIG. 13]

FIG. 13 is a diagram showing examples of the positioning of the fuel injection device 170. FIG. 13 schematically depicts the engine 120 seen in the direction B shown in FIG. 3 (seen from above).

As shown in FIG. 13, in the region extending further forward than the rear top of the intake port 131 (in the region on the front side of the broken line D), the fuel injection device 170 can be located in the front area extending 180 degrees around the center axis (vertical axis) of the intake port 131. For example, the fuel injection device 170 may be disposed to incline leftward and obliquely upward with respect to the intake port 131, or to incline rightward and obliquely upward with respect to the intake port 131. The fuel injection device 170 may be disposed to incline leftwardly frontward and obliquely upward with respect to the intake port 131, or rightwardly frontward and obliquely upward with respect to the intake port 131. In the first embodiment, the fuel injection device 170 is disposed, as shown by the solid line, to incline forward and obliquely upward with respect to the intake port 131.

While the embodiments above use the first throttle valve 161 and the second throttle valve 162 as the first opening/closing mechanism and the second opening/closing mechanism, any other kinds of opening/closing mechanisms capable of controlling the area of the air passage in the throttle body 160, such as suction pistons, rotary valves, etc., may be used.

Also, while the embodiments have described an application of the invention to a motorcycle as an example of a saddle-straddling type motor vehicle, the invention is similarly applicable also to other types of saddle-straddling type motor vehicles that a rider drives while straddling a seat, such as three-wheelers, buggy-type four-wheelers, etc.

Also, a cover having an air passage, through which the wind blowing in running passes, may be attached in front of the engines 120, 220 of the motorcycles 100, 200 of the embodiments.

Also, with the engine disposed in the front of a saddle-straddling type motor vehicle, an air passage may be formed to guide to the engine the wind blowing from ahead. With this structure, even when the front of the engine is covered by a cover, the saddle-straddling type motor vehicle is hit by the wind in running, and so it is possible to obtain functions and effects similar to those of the motorcycles 100 and 200 of the embodiments.

Also, the intake port and the exhaust port may be bent in any directions when the fuel injection device of a saddle-straddling type motor vehicle is positioned in the front of the engine and hit by the windblowing in running. For example, the intake system and the exhaust system may be arranged respectively on the left and right sides of the engine.

INDUSTRIAL APPLICABILITY

The present invention is applicable to under-bone type two-wheeled motor vehicles, three-wheeled motor vehicles, buggy-type four-wheeled motor vehicles, and the like.

What is claimed is:

1. A saddle-straddling type motor vehicle, comprising:
   an air-cooled engine attached to a body frame and having a cylinder block located on a rear side in a direction in which said motor vehicle runs and a cylinder head located on a front side in the direction in which said motor vehicle runs;

a primary passage that guides air into a combustion chamber of said air-cooled engine;

a fuel injection device having an injection nozzle that injects fuel in said primary passage; and a secondary passage that branches off from upstream of said primary passage and that guides air to a vicinity of said injection nozzle of said fuel injection device at least when said air-cooled engine is idling, said fuel injection device being located further forward than said cylinder block in the direction in which said motor vehicle runs.

2. The saddle-straddling type motor vehicle according to claim 1, wherein said air-cooled engine further comprises an intake valve located at a border between said primary passage and said combustion chamber, and said fuel injection device is situated at an incline between said primary passage and said intake valve.

3. The saddle-straddling type motor vehicle according to claim 1, wherein said body frame includes:

a head pipe disposed approximately uprightly in a front part of said motor vehicle; and a main frame extending rearward and obliquely downward from said head pipe.

4. A saddle-straddling type motor vehicle, comprising:

a body frame situated from a front part to a rear part of said motor vehicle; and an air-cooled engine attached to said body frame, said body frame including a head pipe disposed approximately uprightly in the front part of said motor vehicle; and a main frame extending rearward and obliquely downward from said head pipe, and said air-cooled engine including a cylinder block forming a cylinder that reciprocatably accommodates a piston;

a cylinder head forming a combustion chamber together with said cylinder block and having a primary passage communicating with said combustion chamber through an intake valve opening;

an intake valve provided to open and close said intake valve opening;

a fuel injection device having an injection nozzle that injects fuel; and a secondary passage that branches off from upstream of said primary passage and that guides air to a vicinity of said injection nozzle of said fuel injection device at least when said air-cooled engine is idling;

said cylinder head being located in a front part under said main frame and said cylinder block being located in a rear part under said main frame such that a center axis of said cylinder extends approximately horizontally in a front-to-rear direction of said motor vehicle and so that said cylinder head is hit by a wind when said motor vehicle runs, and said fuel injection device being provided in said cylinder head so that said fuel injection device injects the fuel toward said intake valve opening from an injection passage in a side wall of said primary passage.

5. The saddle-straddling type motor vehicle according to claim 4, wherein said primary passage extends approximately uprightly from said intake valve opening, said intake valve is located so that its axis extends approximately in the front-to-rear direction, and said fuel injection device is located at an incline between said primary passage and said intake valve.

6. The saddle-straddling type motor vehicle according to claim 4, wherein said primary passage extends approximately uprightly from said intake valve opening, said intake valve is located so that its axis extends approximately in the front-to-rear direction, and said fuel injection device is located at an incline on a side of said primary passage.

7. The saddle-straddling type motor vehicle according to claim 4, wherein said air-cooled engine further comprises:

a throttle body extending upward from said primary passage; and a first opening/closing mechanism capable of opening and closing in said throttle body, and wherein said secondary passage branches off from a part of said throttle body that is upstream of said first opening/closing mechanism.

8. The saddle-straddling type motor vehicle according to claim 7, wherein said engine further comprises a second opening/closing mechanism capable of opening and closing and located, in said throttle body, upstream of the part from which said secondary passage branches off.

9. The saddle-straddling type motor vehicle according to claim 8, wherein, when no load is placed on said engine and when a load equal to or smaller than a first value is placed on said engine, said first opening/closing mechanism is approximately full closed and an open degree of said second opening/closing mechanism is controlled by an operation by a rider.

10. The saddle-straddling type motor vehicle according to claim 9, wherein, when a load larger than said first value is placed on said engine, an open degree of said first opening/closing mechanism is controlled by an operation by the rider, and the open degree of said second opening/closing mechanism is controlled in association with said first opening/closing mechanism.

11. The saddle-straddling type motor vehicle according to claim 10, wherein, when the load placed on said engine is equal to or smaller than a second value that is larger than said first value, an air flow rate in said secondary passage increases as the load placed on said engine increases, and when the load placed on said engine exceeds said second value, the air flow rate in said secondary passage decreases.

12. The saddle-straddling type motor vehicle according to claim 11, wherein, while the load placed on said engine is larger than said second value, the air flow rate in said secondary passage remains approximately constant.

13. The saddle-straddling type motor vehicle according to claim 12, wherein, when the load placed on said engine is larger than said first value, an air flow rate in said primary passage increases as the load placed on said engine increases.

14. The saddle-straddling type motor vehicle according to claim 4, wherein a distance from a tip of said injection nozzle of said fuel injection device to said intake valve opening is 4 cm or less.

15. The saddle-straddling type motor vehicle according to claim 4, wherein said fuel injection device is situated so that at least part of said fuel injection device is exposed outside from said cylinder head.

16. The saddle-straddling type motor vehicle according to claim 4, wherein said fuel injection device is situated to incline obliquely upward toward a front with respect to a horizontal direction.

17. The saddle-straddling type motor vehicle according to claim 4, wherein said intake valve is located so that its axis is inclined obliquely upward toward a front at an angle larger than 0 degree and smaller than 45 degrees with respect to a horizontal direction.

18. The saddle-straddling type motor vehicle according to claim 17, wherein said cylinder head has an exhaust passage that guides burned gas outside from said combustion chamber through an exhaust valve opening, said engine further comprises an exhaust valve provided to open and close said exhaust valve opening, and said exhaust valve is situated so that its axis is inclined obliquely downward toward the front at an angle larger than 0 degree and smaller than 45 degrees with respect to the horizontal direction.

* * * * *